(12) United States Patent
Frey et al.

(10) Patent No.: US 12,117,622 B2
(45) Date of Patent: Oct. 15, 2024

(54) DETECTOR WITH DEFLECTING ELEMENTS FOR COHERENT IMAGING

(71) Applicant: COMMISSARIAT A L'ENERGIE ATOMIQUE ET AUX ENERGIES ALTERNATIVES, Paris (FR)

(72) Inventors: Laurent Frey, Grenoble (FR); Anis Daami, Grenoble (FR); Stéphane Fanget, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 756 days.

(21) Appl. No.: 17/320,073

(22) Filed: May 13, 2021

(65) Prior Publication Data

US 2021/0364813 A1    Nov. 25, 2021

(30) Foreign Application Priority Data

May 20, 2020   (FR) ...................................... 2005190

(51) Int. Cl.
*G02B 27/48* (2006.01)
*G01S 7/481* (2006.01)
(Continued)

(52) U.S. Cl.
CPC ............ *G02B 27/48* (2013.01); *G01S 7/4817* (2013.01); *G01S 17/04* (2020.01); *G01S 17/90* (2020.01); *G02B 26/0841* (2013.01)

(58) Field of Classification Search
CPC ..... G02B 27/48; G02B 26/0841; G01S 17/90; G01S 17/04; G01S 7/4817
(Continued)

(56) References Cited

U.S. PATENT DOCUMENTS

| 2002/0186483 A1* | 12/2002 | Hagelin ............. G02B 26/0841 359/224.1 |
| 2007/0003187 A1* | 1/2007 | Nakano ................ G02B 6/2931 385/18 |

(Continued)

FOREIGN PATENT DOCUMENTS

| FR | 2000408 | 1/2020 | |
| FR | 3106417 B1 * | 1/2022 | ............. G01S 17/34 |

OTHER PUBLICATIONS

Aflatouni, et al., "Nanophotonic coherent imager", Optics Express, vol. 23, No. 4, pp. 5117-5125, 2015.
(Continued)

*Primary Examiner* — Stephone B Allen
*Assistant Examiner* — Leonidas Boutsikaris
(74) *Attorney, Agent, or Firm* — BakerHostetler

(57) ABSTRACT

A detection device for a coherent imaging system includes a detector comprising a matrix array of pixels, each pixel comprising a photodetector component having a photosensitive surface, the detector being designed to be illuminated by a coherent beam, called the image beam consisting of grains of light called speckle grains, a matrix array of transmissive deflecting elements configured to be individually orientable by means of an electrical signal, so as to deflect a fraction of the image beam incident on the group, and thus modify the spatial distribution of the speckle grains in the plane of the photosensitive surface, each group of one or more pixels further comprising a feedback loop associated with the deflecting element and configured to actuate the deflecting element so as to optimize the signal-to-noise ratio from the light detected by the one or more photodetector components of the group of pixels, the feedback loop comprising a feedback circuit.

14 Claims, 20 Drawing Sheets

(51) Int. Cl.
  *G01S 17/04*   (2020.01)
  *G01S 17/90*   (2020.01)
  *G02B 26/08*   (2006.01)

(58) Field of Classification Search
  USPC ........................................................ 359/279
  See application file for complete search history.

(56) References Cited

U.S. PATENT DOCUMENTS

| | | | |
|---|---|---|---|
| 2015/0070659 A1* | 3/2015 | Chen ...................... | G02B 27/48 353/38 |
| 2015/0268481 A1 | 9/2015 | Strohmeier et al. | |
| 2018/0143319 A1* | 5/2018 | Hofmann ................ | G01S 17/08 |
| 2019/0025426 A1* | 1/2019 | Satyan ................... | G02B 27/30 |
| 2019/0293956 A1 | 9/2019 | Khachaturian et al. | |
| 2021/0211069 A1* | 7/2021 | Reed ...................... | H02N 1/006 |
| 2023/0048766 A1* | 2/2023 | Frey ...................... | G01S 7/4816 |

OTHER PUBLICATIONS

Shevlin, "Speckle reduction within nanosecond-order pulse widths for flash lidar applications", The 9th Laser Display and Lighting Conference (LDC 2020), Apr. 21-24, 2020.

* cited by examiner

DETECTOR WITH DEFLECTING ELEMENTS FOR COHERENT IMAGING

CROSS-REFERENCE TO RELATED APPLICATIONS

This application claims priority to foreign French patent application No. FR 2005190, filed on May 20, 2020, the disclosure of which is incorporated by reference in its entirety.

FIELD OF THE INVENTION

The present invention relates to the field of coherent imaging and of coherent lidar imaging. More particularly, the invention relates to the detectors used in such systems.

BACKGROUND

The known field of coherent imaging consists in forming an image of a scene illuminated by a coherent source, such as a laser, via imaging optics imaging the scene on a detector. This type of imaging is also called active imaging because the detector is combined with its own source of illumination in order to illuminate the scene at the moment of observation, typically a laser. The use of an ad hoc wavelength makes it possible for example to image a scene through elements that scatter visible light but not the illumination light or to image a night scene. Imaging a scene using lidar takes advantage of the coherent nature of the emission of a laser source in order to amplify the useful signal reflected by the scene using a signal from a reference path that is coherent with the useful signal.

The principle of coherent lidar is well known in the prior art. Coherent lidar comprises a coherent source, typically a laser, which emits a coherent light wave (in the IR, visible or near-UV range), an emission device which allows a volume of space to be illuminated, and a reception device, which collects a fraction of the light wave backscattered by a target T. The Doppler frequency shift of the backscattered wave is dependent on the radial velocity v of the target T: On reception, the received backscattered light wave, called the signal wave S, of signal frequency fs, is mixed with a portion of the emitted wave that has not passed via the scene, called the LO (local oscillator) wave, that has a local oscillator frequency $f_{LO}$. The interference of these two waves is detected by a photodetector PD, and the electrical signal at the output of the detector has an oscillating term called the beat signal Sb, in addition to the terms proportional to the received power and to the local oscillator power. This signal is digitized and information on the location of an object located in a scene to be observed is extracted therefrom.

In frequency modulated coherent lidar, called FMCW (frequency modulated continuous wave) lidar, schematically shown in FIG. 1, the optical frequency of the coherent source f is modulated, typically using a periodic linear ramp.

Thus, FMCW lidar imaging comprises the following steps:
the electromagnetic frequency of a coherent light source such as a laser is modulated,
the beam emitted by the laser is split into two paths by a splitting element: a first path which illuminates a point of the scene, from which the light is subsequently backscattered and a portion of which reaches the photoreceptor, and a reference path (local oscillator) which does not pass via the scene, and takes a shorter route to reach the photodetector,
the two paths are recombined, i.e. they are spatially superposed using a recombiner element, and therefore the two paths interfere, in particular on the photodetector, with different wavelengths/frequencies given the delay, i.e. the difference in optical route taken. The interference manifests as temporal oscillations in luminous intensity, or beats, the frequency of which is proportional to the delay between the two paths, and therefore to the distance. The beats are measured by the photodetector, and the distance to be measured is proportional to the frequency of the beats.

More specifically, for a linear ramp, the frequency of the oscillations is:

$$f_R = \frac{2Bz}{cT}$$

with B the optical frequency excursion or "chirp" over the duration T of the ramp, z the distance, c the speed of light.

The distance z is deduced from the number $N(N \approx T f_R)$ of periods measured over the duration T:

$$z \approx \frac{Nc}{2B}$$

The distance resolution is:

$$\delta z \approx \frac{c}{2B}$$

It is also possible to measure $f_R$ by way of spectral analysis via Fourier transform of the beat signal.

The interference signal contains a DC component that is generally large and useless, which is removed by means of high-pass electronic filtering if the photoreceptor is a photodiode. In fibre-based setups, it is practical to use a 3 dB coupler which provides, on the basis of the two, object and reference, paths as input, two output signals in phase opposition which illuminate two photodiodes in series (balanced photodiodes). The detection circuit makes it possible to differentiate between the two photocurrents, and therefore to remove the DC (common mode) portion and to detect the AC (beat signal) portion. The AC portion is generally amplified externally by a transimpedance amplifier (TIA) before being processed by external electronics, for example an oscilloscope, in order to measure the frequency.

The FMCW lidar technique is an optical heterodyne measurement technique (i.e. it involves a plurality of optical frequencies). The technique is highly insensitive to stray ambient light such as for example sunlight.

To produce a complete image of the scene, the lidar sequentially scans the scene using a scanning device ("rolling-shutter"-type image).

In practice, it is difficult to achieve acquisition of distance images at video frame rates (typically 50 Hz) for high-resolution images (for example VGA or XGA) because the time available for the distance measurement at each point is very short.

Instead of taking measurements point by point, the publication Aflatouni "Nanophotonic coherent imager" (2015, Optics Express vol. 23 no. 4, 5117), which also uses the FMCW technique, describes a device in which the entire scene is illuminated simultaneously by the laser beam which has been made divergent, and photodetection is performed in parallel for the entire scene. In this publication (see FIG. 2), the laser source Las is frequency modulated by a modulator Mod, the object path illuminates the object to be analysed O and a lens L forms the image of the object on a coherent imager IC produced with integrated optics, more specifically on a matrix array of 4×4 optical coupling gratings Res. Each grating Res sends the coupled light into a lateral-coupling photodiode PD located outside the image, via a waveguide (see FIG. 3). The reference path is sent directly to the photodiodes via an optical fibre Fib and via a network of waveguides and Y-junctions. The conversion of the photocurrent into voltage is performed by a transimpedance amplifier TIA for each of the 16 photodiodes. Electronic filtering and signal processing are performed outside the chip in an electronic detection system SED.

This technique of detecting the entire scene in parallel is more suitable in principle for increasing the rate of acquisition of distance images.

However, in the architecture of the imager described in the Aflatouni publication, the configuration of the coherent imager is not readily scalable to a large number of pixels. It would require 2N waveguides (N for the reference path and N for the object path) for N pixels, i.e. two million guides for an imager of 1000×1000 pixels, which presents huge routing and footprint problems. To artificially increase the effective number of pixels of their imager, the authors resort to the technique of multiple image captures with successive mechanical translations of the imager, which is not suitable for moving scenes.

Another problem intrinsic to coherent imaging and to lidar is due to the coherent nature of the light backscattered by the scene to be observed. Because of this coherence, the backscattered light exhibits, in a known manner, a granular structure called speckle. At detection level, the image of the object in the plane of the sensor is marked with speckle grains, the value of the lateral size of which is statistically:

$$\Phi g = 2.\lambda f\#$$

with $f\# = f/D$ where f is the focal length of the imaging objective and D the diameter of its exit pupil.

Thus, for the lidar described in the publication cited above, the beats due to the interference between the reference path and the object path which is affected by speckle are of the same frequency but phase-shifted randomly between adjacent speckle grains.

If the pixels (i.e. the arrays collecting the light) have a dimension $a_{pix}$ larger than that of the speckle grains $\Phi g$, as illustrated in FIG. 4 on the left, the amplitude of the resulting oscillations is attenuated and may become undetectable. Given the size of the diffraction gratings indicated (17×17 μm) and the wavelength of 1.55 μm, a large aperture number ($f\# > 6$) would be required to have speckle grains larger than the pixels. However, such a narrow-aperture optic is not favourable to the detection of relatively unreflective objects or those located substantial distances away, which will give very small backscattered photon fluxes; to compensate, this means using a laser source of higher power and therefore of higher electrical consumption, with the risk of exceeding the limits for eye safety. Thus, for a wide-aperture optic allowing the capture of a larger number of photons, the size of the speckle grains at the eye-safe wavelength of 1.55 μm is typically smaller than that of the light-collecting surface of a pixel, which presents detection problems.

When the detector detects only backscattered light (beatless coherent imaging), the presence of these grains, distributed randomly, also presents detection problems because these grains are not a priori positioned optimally with respect to the sensitive surface of the elementary detector of the pixel, which decreases the sensitivity of the system.

SUMMARY OF THE INVENTION

An object of the present invention is to overcome the aforementioned drawbacks by providing an integrated detector for coherent imaging or coherent lidar that is compatible with a large number of pixels and allows optimal detection of backscattered light marked with speckle grains of small size.

One subject of the present invention is a detection device for a coherent imaging system comprising:
 a detector comprising a matrix array of pixels, each pixel comprising a photodetector component having a photosensitive surface, the detector being designed to be illuminated by a coherent beam, called the image beam consisting of grains of light called speckle grains,
 a matrix array of transmissive deflecting elements arranged on the side of the illumination by the coherent beam, a deflecting element being associated with a group of one or more pixels comprising at least one pixel, and configured to be individually orientable by means of an electrical signal, so as to deflect a fraction of the image beam incident on said group, and thus modify the spatial distribution of the speckle grains in the plane of the photosensitive surface,
 each group of one or more pixels further comprising a feedback loop associated with the deflecting element and configured to actuate the deflecting element so as to optimize the signal or the signal-to-noise ratio from the light detected by the one or more photodetector components of said group of pixels, the feedback loop comprising a feedback circuit.

According to one embodiment, the deflecting element is chosen from a prism, a polyhedron, a spherical dome, and a diffractive optical element. According to one embodiment, each deflecting element comprises at least two electrodes respectively facing at least two electrodes arranged on the surface of the detector, the deflecting element being actuated electrostatically by applying voltages to the electrodes, on at least one axis of rotation parallel to the plane of the detector.

According to one embodiment, a deflecting element is associated with a group of n×m pixels, the feedback being produced on the basis of the n×m signals detected by the photodetector components of said pixels of the group, according to an optimization criterion.

According to one variant, the detector further comprises a matrix array of coupling zones that is arranged between the matrix array of deflecting elements and the photodetector component, a coupling zone being associated with a pixel and configured to form an aperture through which the image beam illuminates the photodetector component of the associated pixel, a dimension of the aperture being smaller than a dimension of the photosensitive surface of the pixel.

According to one embodiment, a distance between the matrix array of deflecting elements and the detector is between one and ten times a dimension of the deflecting element.

According to another aspect, the invention relates to a coherent imaging system comprising:
 a laser source configured to emit a laser radiation in the direction of a scene to be observed,
 a detection device according to the invention, an optical imaging system producing an image of the scene by focusing a beam reflected by the scene on the detector, forming said image beam.

The invention also relates to a coherent lidar imaging system comprising:
- a laser source configured to emit a laser radiation with a temporally modulated optical frequency,
- a splitting/recombining optical system comprising at least:
- a splitter optical system designed to spatially split the laser radiation into a beam called the reference beam and into a beam called the object beam that is directed towards the scene to be observed;
- a recombining optical system designed to spatially superpose the reference beam onto the beam reflected by said scene, so as to form a recombined beam,
- a detection device according to the invention,
- an optical imaging system having an optical axis and producing an image of the scene by focusing a beam reflected by the scene on the detector, forming said image beam,
- the splitting/recombining optical system and the optical imaging system being configured such that each pixel of the detector receives a portion of the image beam and a portion of the reference beam, and that said portions are spatially superposed coherently onto each pixel,
- the coherent lidar imaging system further comprising at least one electronic processing circuit configured to calculate, for each pixel, a frequency of a beat of the portion of the image beam with the portion of the reference beam illuminating said pixel,
- a processing unit connected to the laser source and to the detection device and configured to determine a distance of points of the scene that are imaged on said pixels, on the basis of the calculated beat frequency associated with each pixel and on the basis of the modulated optical frequency of the laser radiation, said electronic processing circuit being located in the detector and/or in the processing unit.

According to one embodiment, the splitting/recombining optical system is further configured to form a real or virtual intermediate image of the reference beam in a plane perpendicular to said optical axis, called the intermediate image plane, said intermediate plane being arranged so as to generate flat-tint fringes, obtained by interference between said portions, on each illuminated pixel.

According to one embodiment, the splitting/recombining optical system is configured so that the intermediate image plane is coincident with a plane comprising a pupil or a diaphragm of said optical imaging system.

According to one variant, the splitter optical system comprises an integrated optical circuit, called the first integrated optical circuit, in which said laser radiation is coupled, at least one waveguide of said first integrated circuit guiding said reference beam, the first integrated optical circuit further comprising a plurality of waveguides each comprising at least one diffraction grating, called the object grating, so as to form the object beam.

According to one variant, the recombining optical system comprises an integrated optical circuit, called the second integrated optical circuit, in which said reference beam is coupled by means of an optical element, the second integrated optical circuit comprising at least one waveguide comprising at least one diffraction grating called the reference grating, the reference grating coupling the reference beam into free space and into the optical imaging system, the second integrated optical circuit being arranged in said intermediate image plane so that the reference grating forms the intermediate image.

According to one embodiment, the optical element is an optical fibre guiding said reference beam from the first integrated optical circuit to said second integrated optical circuit.

According to another variant, the splitting/recombining optical system comprises an integrated optical circuit, called the third integrated circuit, in which said laser radiation is coupled, said integrated optical circuit comprising the splitter optical system and said recombining optical system.

According to another variant, the splitting/recombining optical system further comprises an intermediate optical system, arranged after the splitter optical system, and before the recombining optical system, the intermediate optical system being designed to focus the reference beam and form said intermediate image.

According to one embodiment, a numerical aperture of the optical imaging system and a wavelength of the laser beam are determined such that a lateral dimension of said speckle grains is smaller than or equal to a dimension of the photosensitive surface of a pixel and larger than or equal to a dimension of the coupling zone, where applicable.

The following description gives a number of exemplary embodiments of the device of the invention: these examples do not limit the scope of the invention. These exemplary embodiments not only have features that are essential to the invention but also additional features that are specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting examples and in which.

DETAILED DESCRIPTION

Figure 1:
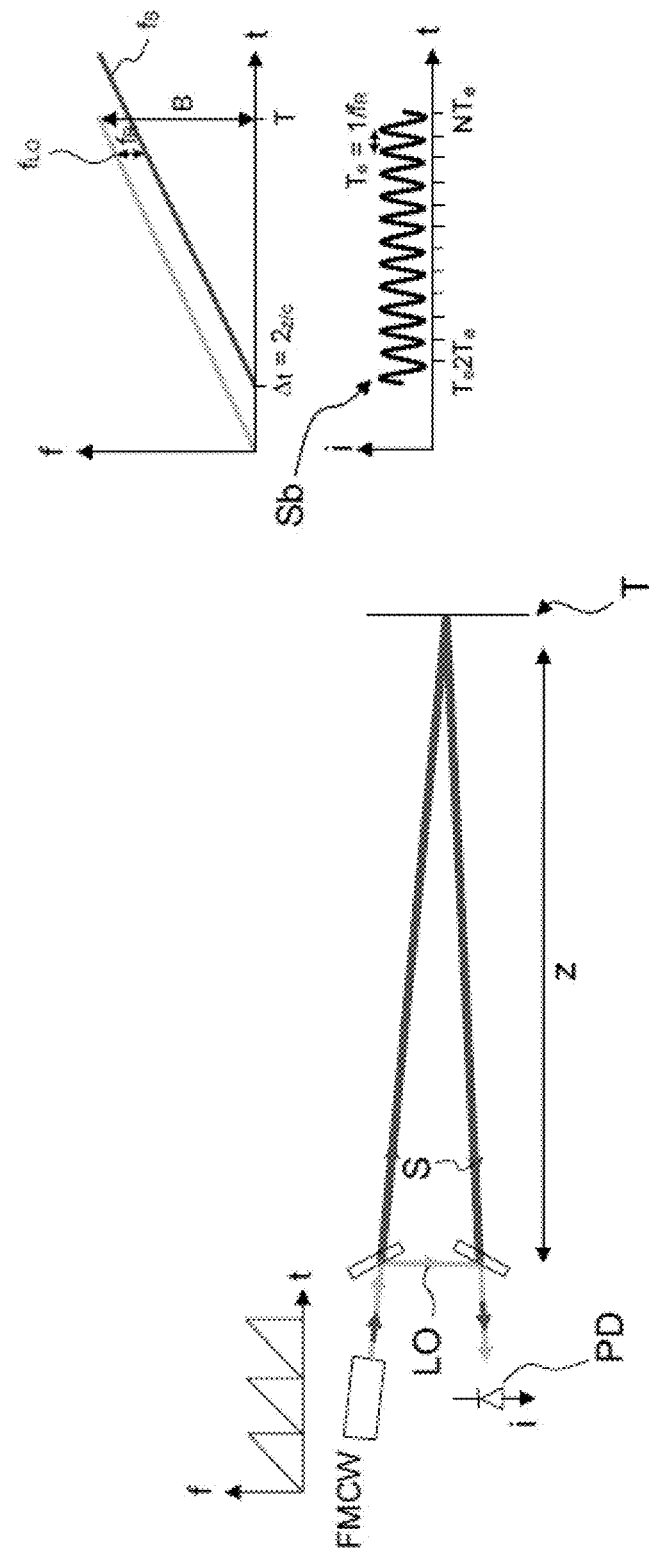
FIG. 1, mentioned above, illustrates the principle of FMCW frequency modulated lidar.
Figure 2:
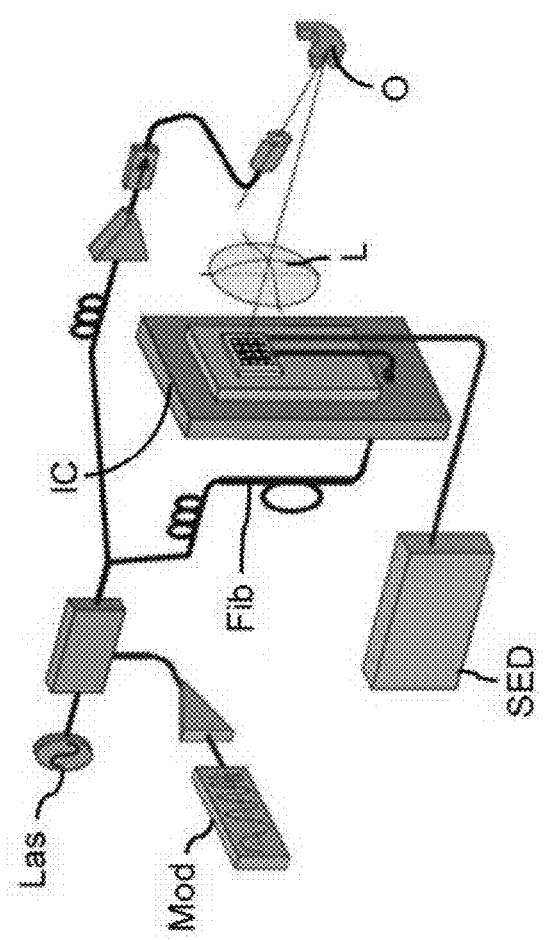
FIG. 2, mentioned above, illustrates a partially integrated FMCW architecture according to the prior art.
Figure 3:
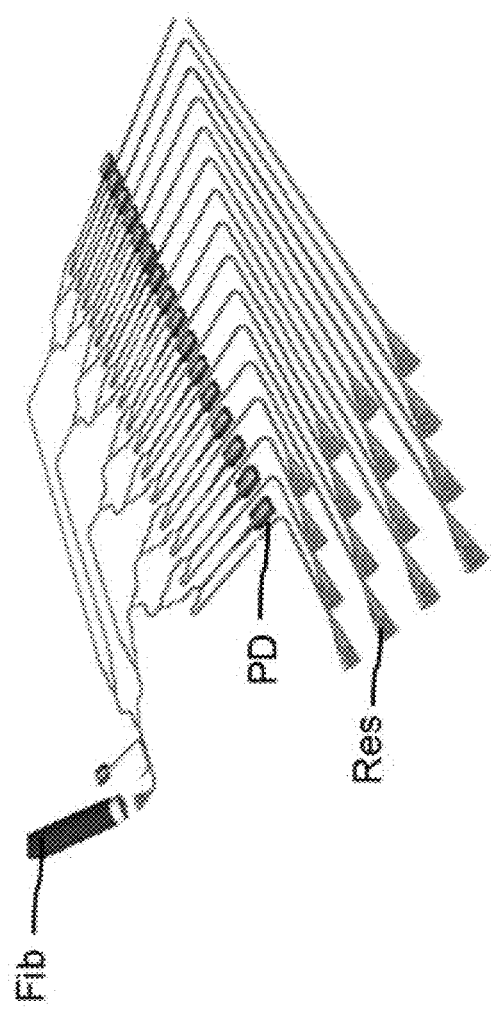
FIG. 3, mentioned above, illustrates the coherent recombination performed by the system described in FIG. 2.
Figure 4:
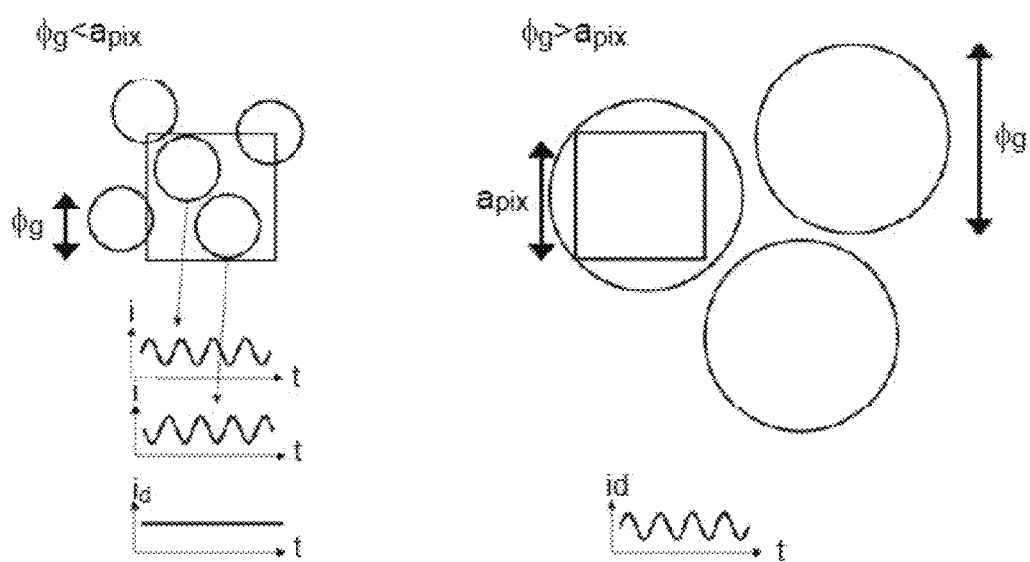
FIG. 4, mentioned above, illustrates two cases of speckle geometry with respect to a pixel of a detector, the figure on the left corresponding to speckle grains smaller than the size of the pixel and the figure on the right corresponding to speckle grains larger than the size of the pixel.
Figure 5:
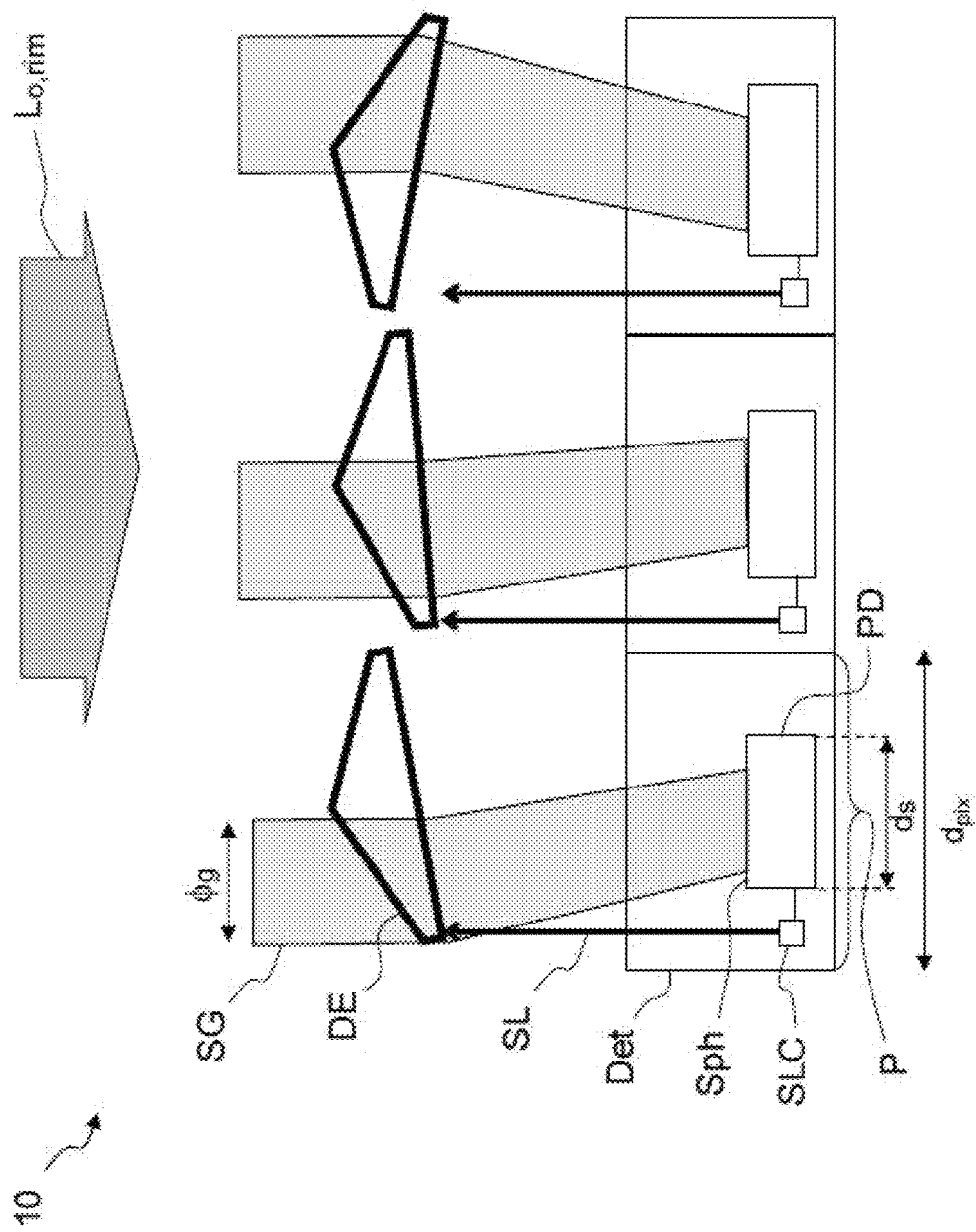
FIG. 5 illustrates the principle of the detection device for a coherent imaging system according to the invention.

FIG. 5 illustrates the principle of the detection device 10 for a coherent imaging system according to the invention. The device 10 comprises a detector Det comprising a matrix array of pixels P, each pixel P comprising a photodetector component PD having a photosensitive surface Sph. Typically, the size of a pixel dpix is from a few microns to a few tens of microns. Preferably, dpix is between 3 µm and 25 µm.

Since each pixel comprises its own detector, it is possible to access a large number of pixels without routing and bulk problems due to multiple waveguides, in contrast to the Aflatouni publication described above.

The detection device is intended for integration into a coherent imaging system or into a lidar, and is therefore designed to be illuminated by a coherent beam called the image beam Lo,rim that consists of grains of light called speckle grains SG as explained above.

Typically, a pixel also comprises, in a known manner, an electronic circuit for readout and for preprocessing of the signal detected by the photodetector, the preprocessing comprising amplification and filtering.

The device 10 also comprises a matrix array of transmissive deflecting elements DE that is arranged on the side of the illumination by the coherent beam. A deflecting element is associated with a group of one or more pixels comprising at least one pixel. The deflecting element DE is configured to be individually orientable by means of an electrical signal, so as to deflect a fraction of the image beam incident on the group, and thus modify the spatial distribution of the speckle grains SG in the plane of the photosensitive surface.

Each group of one or more pixels also comprises a feedback loop SL associated with the deflecting element DE and configured to actuate the deflecting element so as to optimize, preferably maximize, the signal or the signal-to-noise ratio from the light detected by the one or more photodetector components of the group of pixels. Thus, the feedback loop ensures optimal distribution of the speckle grains with respect to the photosensitive surface Sph.

The feedback loop comprises a feedback circuit SLC which, on the basis of the one or more signals detected by the photodetector components of the pixels of the group, delivers an electrical signal to the deflecting element according to an optimization criterion.

Figure 7:
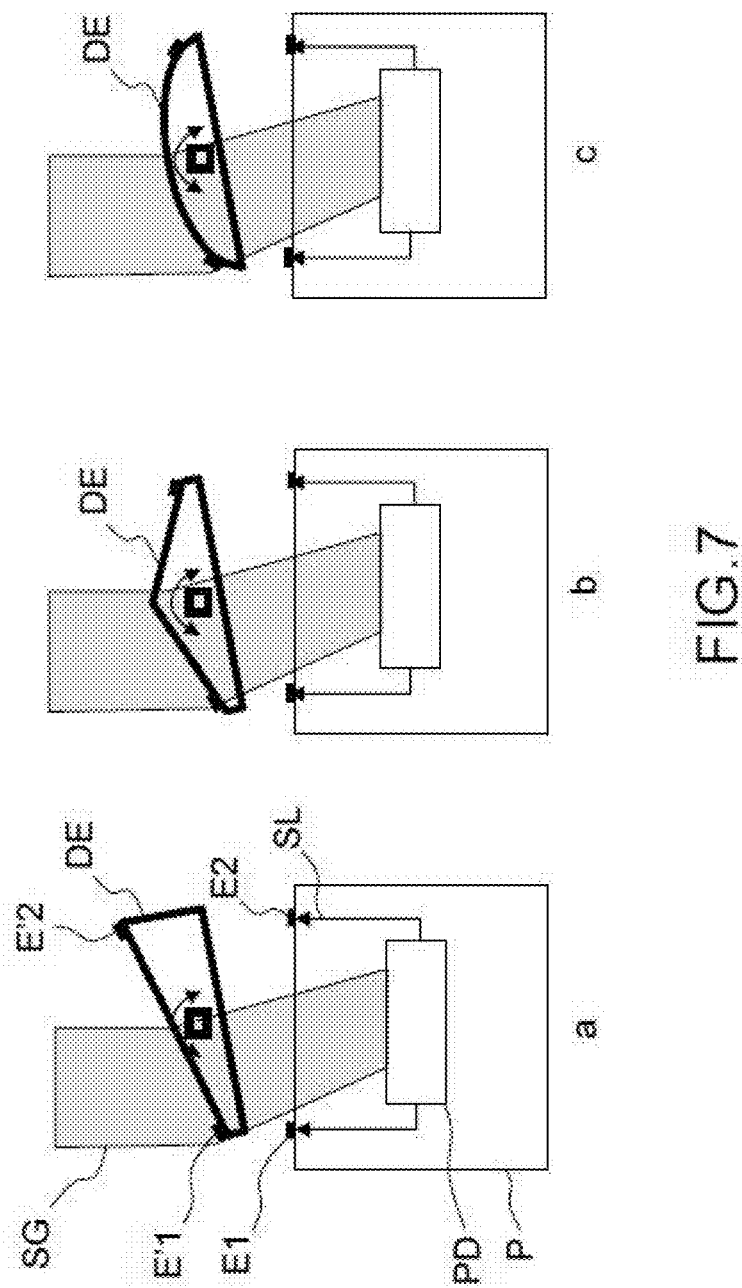
FIG. 7 illustrates three exemplary embodiments of a deflecting element having an electrostatic mode of actuation.

The element DE is of non-constant thickness, and is orientable on one axis or on two axes, these one or more axes of rotation being perpendicular to the plane of the detector. It is preferably chosen from among a prism (rotation on one axis), a polyhedron, a spherical dome (see FIG. 7 illustrating these three shapes), or a diffractive optical element. The size of an individual deflecting element is that of a pixel or of a group of contiguous pixels, i.e. in practice from a few microns to a few hundred microns.

In coherent imaging or in lidar, the beam from the scene and incident on the matrix array of deflecting elements is a speckle field referred to as subjective because it is the speckle formed in the image of a scene by an optical imaging system. The lateral characteristic size of the speckle grains is $2.\lambda.f\#$, of the same order of magnitude as the Airy disc or diffraction disc of the optical system, ignoring geometric aberrations of the optical system.

Figure 6:
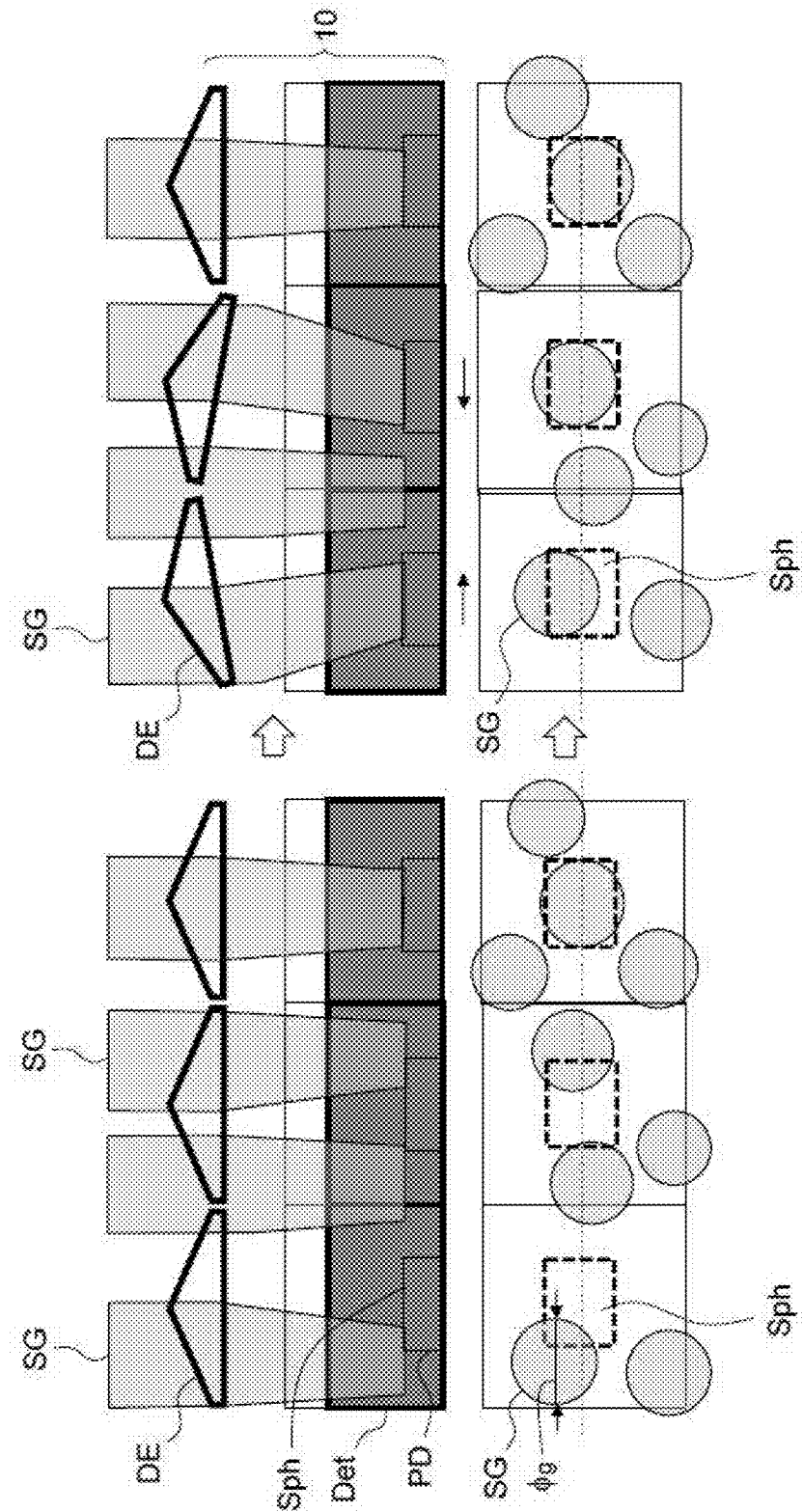
FIG. 6 illustrates the way in which the matrix array of deflecting elements globally modifies the topography of the speckle field of the illumination beam in the plane of the pixel.

The matrix array of deflecting elements DE globally modifies the topography of the speckle field of the illumination beam in the plane of the pixel, and in particular the distribution of the speckle grains SG, as illustrated in FIG. 6. In this example, there is one element DE per pixel. $\Phi g$ denotes the average diameter of the cross section of a speckle grain in the plane of the pixel (i.e. in the plane of the photodetector and of its photosensitive surface), which remains of the same order of magnitude as upstream of the matrix array of deflecting elements, giving (see above):

$$\Phi g = 2.\lambda.f\#$$

When the orientation of a deflecting element is modified, this also modifies the distribution of the speckle grains in the plane of the pixel and therefore the arrangement of the grains with respect to Sph, allowing the incident light to be detected. It is sought to centre a speckle grain on the photosensitive surface of PD. This modifying of the speckle field is generally complex and difficult to describe analytically because the deflecting elements operate in diffractive mode, i.e. the effects of diffraction related to their relatively small individual lateral size and to their matrix-array organization are non-negligible.

In practice, the local speckle field with respect to the surface of the pixel is modified blind. Neither the initial distribution nor the final distribution of the speckle at the surface of the pixel is known.

For a coherent imaging application, it is typically sought to optimize, preferably maximize, the signal-to-noise ratio. It is therefore the one or more signals detected by the one or more photodetectors of the group which are used as a feedback signal for the actuation of the deflecting element. In the case of a deflecting element for a group of pixels, with a plurality of detected signals, the position of the deflecting element is the result of the application of an optimization criterion to these detected signals.

For a lidar application, the actuation of the deflecting elements aims to increase the heterodyne signal detected by the photodiode PD. This starts with the initial AC signal delivered by the photodetector, corresponding to the beat signal of the lidar (variable component of the detected signal). The orientation of the deflecting element is modified in one direction: if the AC signal increases, this is continued, and if it decreases, it is oriented in the other direction. An optimum of the AC signal is sought by following an optimization algorithm in a problem with one or two dimensions depending on whether the number of axes of rotation of the rotation element is one or two. It is possible to arrive at a local, or absolute, maximum, but in any case at one higher than the initial value of the AC signal. If the AC signal is initially zero or near-zero, the available space is scanned until a signal is obtained. The AC oscillation signal detected by each photodetector is therefore used as a feedback signal for the actuation of the deflecting element: it is this AC signal which is maximized in actuating the deflecting element. By maximizing the AC signal, the detected signal-to-noise ratio is maximized, i.e. the heterodyne signal is increased and therefore the heterodyne efficiency is improved by limiting the impact of the speckle (see further below for a detailed calculation).

The detection device 10 according to the invention thus makes it possible to improve the detection of coherent light marked with speckle.

When a deflecting element is associated with a group of n×m pixels, the feedback is produced on the basis of the n×m signals detected by the photodetectors of the pixels of the group, and the optimization algorithm has n×m inputs. The deflection of the element DE then corresponds to a trade-off between the various pixels of the group.

The use of deflecting elements as described in FIGS. 5 and 6 is particularly appropriate when the size of the speckle grains (average diameter $\Phi g$) is smaller than that of the pixel (denoted by dpix), to a size of the order of magnitude of that of the surface Sph of the photodetector, or even slightly smaller. Typically, Sph is square or rectangular in shape, and ds is its smallest dimension.

Thus, the system into which the detector is integrated is dimensioned so that the diameter $\Phi g$ of the grain SG is between:

$$ds/2 \leq \Phi g \leq dpix$$

The proportion of the surface of the pixel that is photosensitive is called the fill factor of the pixel. This factor varies from a few percent to 100% depending on the technology, and therefore the ratio ds/dpix is highly variable depending on the technology. The presence of a deflecting element is advantageous when this ratio is between a few percent and 85%.

The dimension ds is typically from a few microns to a few tens of microns. These dimensions are compatible with a relatively wide-aperture imaging optic, preferred for capturing as much light from the scene as possible. By way of example, for $\lambda=1.55$ µm and f #=3, $\Phi g$ is of the order of 10 µm.

When the speckle grains are smaller such that a plurality of grains are able to be copresent on the surface Sph, this is detrimental to heterodyne detection (see above). One variant of the device 10 addresses this situation and will be described further below.

FIG. 7 illustrates three exemplary embodiments of a deflecting element having an electrostatic mode of actuation. FIG. 7a illustrates a prism, FIG. 7b a roof-shaped polyhedron and FIG. 7c a lens. The feedback circuit SLC is not shown.

Figure 8A:
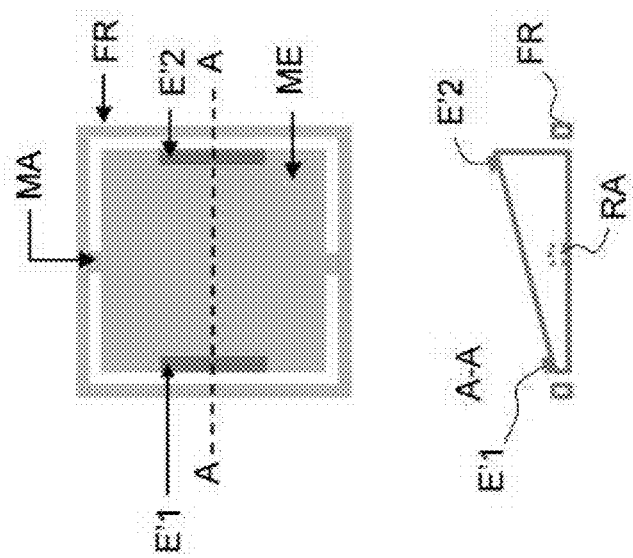
FIG. 8A illustrates a deflecting element in the shape of a prism that is able to pivot about a horizontal axis.
Figure 8B:
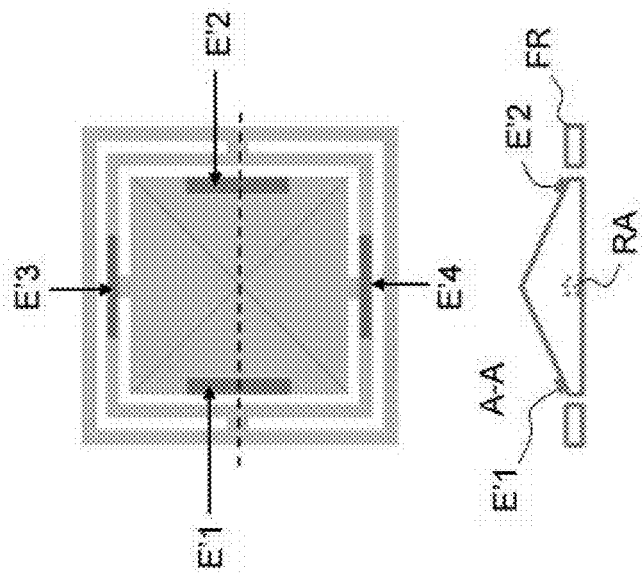
FIG. 8B illustrates a deflecting element as a roof-shaped polyhedron that is able to pivot about two horizontal axes.

Seen from above, the deflecting element takes the shape of a plate of non-constant thickness that is able to pivot about at least one horizontal axis RA, and is held on the sides by two lateral arms MA in a direction perpendicular to this axis of rotation, as illustrated in FIG. 8A for a prism (one axis of rotation) and in FIG. 8B for a roof-shaped polyhedron. The arms are connected to a fixed and rigid frame FR on the periphery of the pixel. In the case of two axes of rotation, there are two frames and one is able to pivot with respect to the other (FIG. 8B).

The electrostatic actuation uses a set of electrodes. Each deflecting element comprises at least two electrodes E'1, E'2 respectively facing at least two electrodes E1, E2 arranged on the surface of the detector, the deflecting element being actuated electrostatically by applying voltages to the electrodes, in the direction of at least one axis of rotation parallel to the plane of the detector. The electrodes E1 and E2 (and, where applicable, two additional electrodes) are located at the surface of the pixel facing the electrodes of the deflecting element. The electrodes E'1, E'2 (and, where applicable, E'3, E'4 see FIG. 11B) of the deflecting element are located either on its upper surface, or inside.

The electrodes on the pixel may be at the same potential, and those of the deflecting element at different potentials, or vice versa. The application of different voltages makes it possible to produce vertically directed electrostatic fields, the direction of which allows the various electrodes to be attracted to one another.

The electronic components (circuit SLC) allowing the feedback-control of the voltage of the electrodes may be located in the CMOS at the same level as the readout electronics for the pixel, or for one pixel of the group (when there is one deflecting element for a group of pixels).

Preferably, the distance between the matrix array of deflecting elements and the detector is between one and ten times the lateral dimension of the deflecting element.

Figure 9:
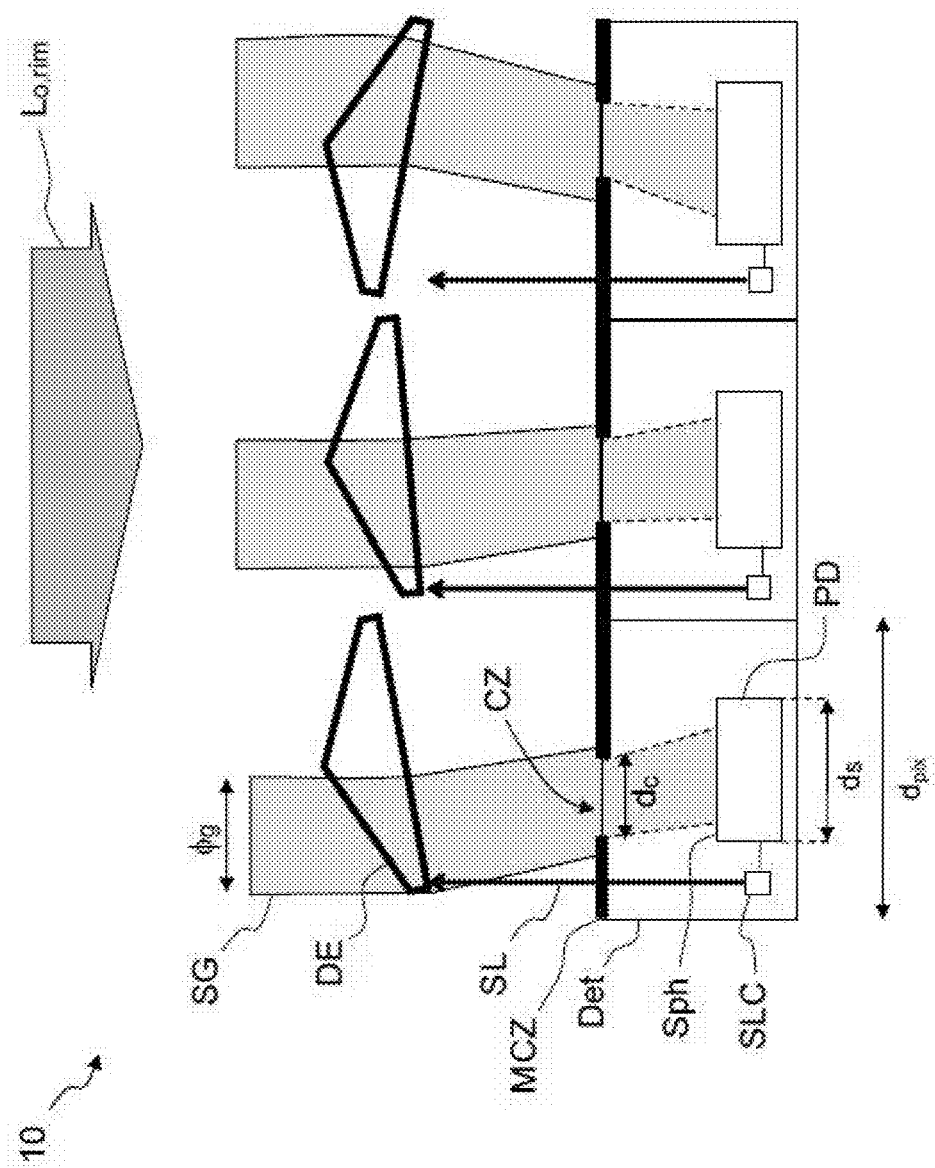
FIG. 9 illustrates one variant of the detection device according to the invention further comprising a matrix array of coupling zones that is arranged between the matrix array of deflecting elements and the photodetector component.

According to one variant illustrated in FIG. 9, the detection device 10 further comprises a matrix array MCZ of coupling zones CZ that is arranged between the matrix array of deflecting elements and the photodetector component. A coupling zone is associated with a pixel and configured to form an aperture through which the image beam Lo,rim illuminates the photodetector component of the associated pixel. The dimension dc of the aperture is smaller than the dimension ds of the photosensitive surface Sph of the pixel.

The light that comes from the scene and is incident on the coupling zone penetrates into the photodetection layer, while the light that falls outside the coupling zone is not detected. It should be noted that when the coupling zone is of small size, of the order of one to a few wavelengths, the light is diffracted downstream of the coupling zone.

The coupling zone CZ is for example delimited by a shield (layer of a material opaque to the working wavelength).

The coupling zone CZ of a pixel is preferably circular in shape so as to best match the granular shape of the speckle. The size of the coupling zone is such that a single speckle grain passes therethrough. With dc its characteristic dimension (diameter of a disc, or side of a square or diagonal of a rectangle), then preferably:

$$d_c \leq \phi_g.$$

Figure 10:
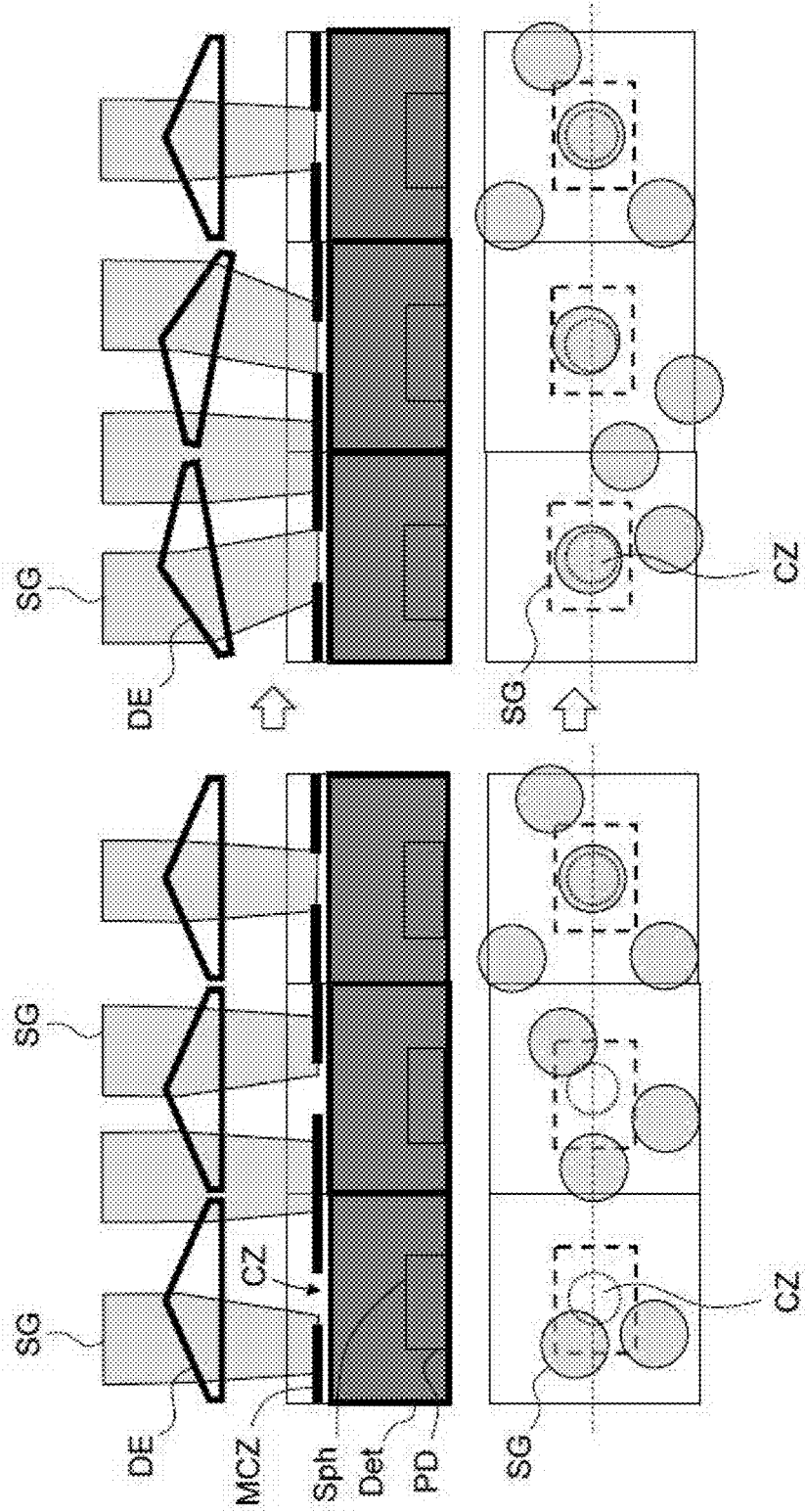
FIG. 10 illustrates how the deflecting elements and the coupling zone make it possible to select a single speckle grain and to best position it for it to be detected by the photodetector.

Coupled to the deflecting elements, the coupling zone makes it possible to select a single speckle grain SG and to best position it for its detection by the photodetector, by virtue of the feedback loop, as illustrated in FIG. 10.

The presence of coupling zones removes the pixel size constraint by making pixels larger than the speckle grains, which facilitates the design of the electronic detection circuit. For a lidar application, the space freed also facilitates the design of the electronic signal processing circuit which calculates beat frequency, or allows a more sophisticated one to be provided (for example a more precise counting circuit to a fraction of a period, or a circuit for simultaneously measuring the distance and the longitudinal velocity of the objects with an alternately rising and falling ramp) as already demonstrated in the literature for FMCW lidar for a given point of the scene.

The use of deflecting elements associated with the coupling zones as described in FIGS. 9 and 10 is appropriate when the dimension of the speckle grains (average diameter $\Phi g$) is smaller than dpix and larger than dc/2, i.e.:

$$dc/2 \leq \Phi g \leq dpix$$

When the speckle grains are too small, the detected signal is too weak to allow satisfactory detection.

Preferably, the distance between the matrix array of deflecting elements and the detection device is between one and ten times a dimension of the deflecting element.

The detector Det is produced in a semiconductor substrate Sub on which is arranged a layer IL called the interconnection layer in a dielectric medium, comprising metal interconnections IM connected to the electronic circuits.

Figure 11A:
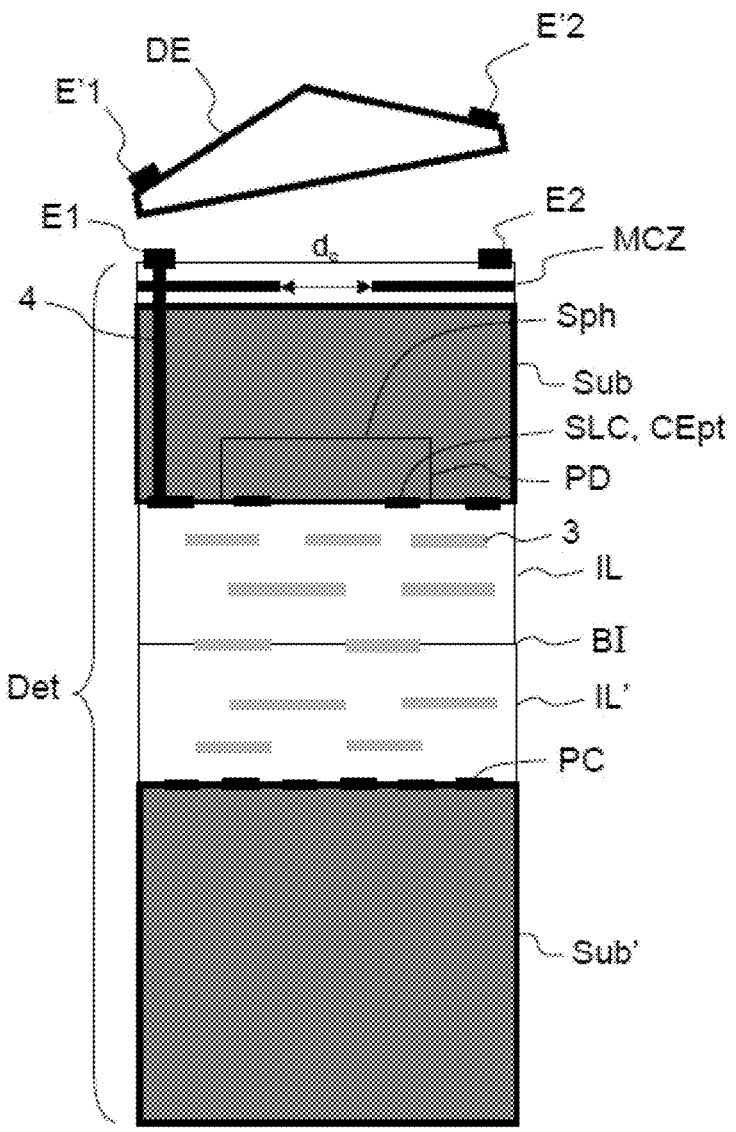
FIG. 11A illustrates one embodiment of a "backside"-type detector.

According to one preferred embodiment, the detector is a "backside"-type detector (BSI) as illustrated in FIG. 11A.

In this configuration which is known in the field of microelectronics, the light is incident on the side of the semiconductor substrate Sub (which is thinned) opposite the metal interconnections. In the context of the invention, the electronic driver, readout and preprocessing circuits for the pixel CEpt, and the feedback circuit SLC, are preferably located on the interface of the semiconductor substrate facing the interconnections. Vias 4 passing through the semiconductor are needed to bias the electrodes that face the deflecting element. The matrix array of coupling zones MCZ is, according to the example, delimited by apertures in a metal or absorbent layer specially provided for this purpose arranged on the substrate on the illumination side.

The thinned substrate is bonded to a carrier substrate Sub' associated with a layer IL', in which CMOS circuits may be included (the imager is then referred to as a "3D stacked" imager). These circuits are the processing circuits PC for calculating the beat frequency (which are located in the pixels or at the periphery of the detector) and optionally some or all of the CEpt circuits. "3D stacking" allows more freedom in the electronics design by shifting a portion of the circuits, including at least the signal processing circuit, to the carrier substrate Sub'. The entire surface of the pixel is available for the processing circuit, which may be complex.

Figure 11B:
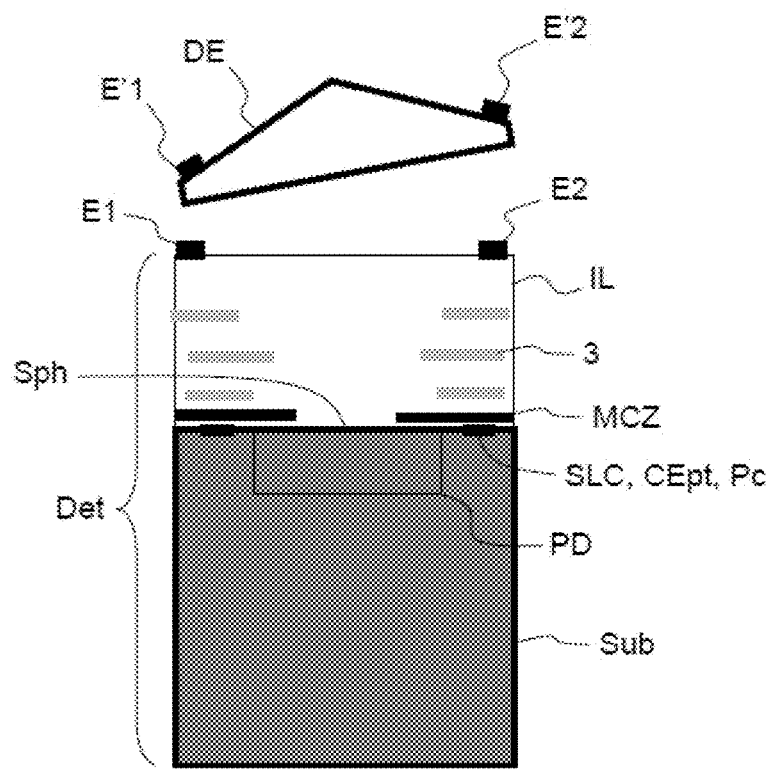
FIG. 11B illustrates one embodiment of a "frontside"-type detector.

According to another, again conventional, embodiment, called "frontside" (FSI) illustrated in FIG. 11B, the illumination takes place via the front face, i.e. the face of the substrate Sub where the metal interconnections are located. In this FSI configuration, all of the electronic circuits (consisting of transistors, filters, etc.) required for the operation of the detector are formed on the surface of the semiconductor: driver and readout circuit for the photodiodes CEpt, feedback circuit SLC, and signal processing circuit PC for measuring the frequency of the beats. According to one embodiment, the coupling zone may be delimited by the metal interconnections 3 themselves which form a central aperture for the light. According to another embodiment, an opaque layer comprising apertures, for example made of metal or absorbent, is arranged over the surface of the semiconductor.

The detector Det is produced in a semiconductor substrate, which may differ according to the wavelength of use: The semiconductor is for example Si for a wavelength situated in the visible or near-infrared range (wavelengths from 0.4 µm to 1 µm), or Ge or a III-V semiconductor (AsGa, InGaAs, etc.) for wavelengths from 0.9 µm to 2 µm.

Figure 12:
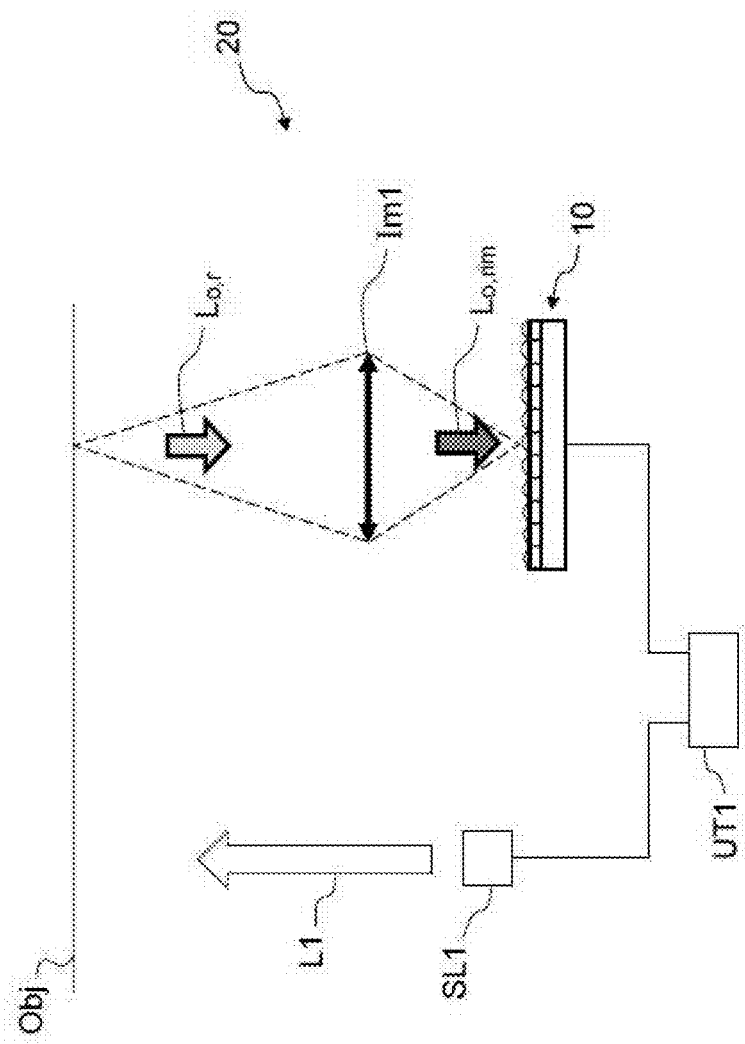
FIG. 12 illustrates a coherent imaging system according to the invention.

According to another aspect, the invention also relates to a coherent (or active) imaging system 20 as illustrated in FIG. 12. The system 20 comprises a laser source SL1 configured to emit a laser radiation L1 in the direction of a scene to be observed Obj, a detection device 10 as described above and an optical imaging system Im1 producing an image of the scene by focusing a beam reflected by the scene Lo,r on the detector, forming the image beam Lo,rim.

The use of a detection device 10 according to the invention allows the sensitivity of the system to be improved.

To have a sufficient amount of light, the illumination is generally pulsed and the detector of the camera (consisting of the optic Im and detection device 10) is synchronized with the emission. A processing unit UT1 connected to the laser source and to the detection device ensures synchronization.

When the detector has a long integration time, all of the objects of the scene are imaged on the detector. The use of an ad hoc wavelength makes it possible for example to image a scene through elements that scatter visible light but not the illumination light or to image a night scene.

In a TOF (time of flight)-type device, the illumination is necessarily pulsed and the detector is provided with a (potentially electronic) shutter synchronized with the emission. The time between the moment when the laser pulse is produced and the moment when the camera is opened (and then closed) (time window) determines the distance viewed. Depending on the delay between emission and reception, it is possible to image a precise section of space.

Figure 13:
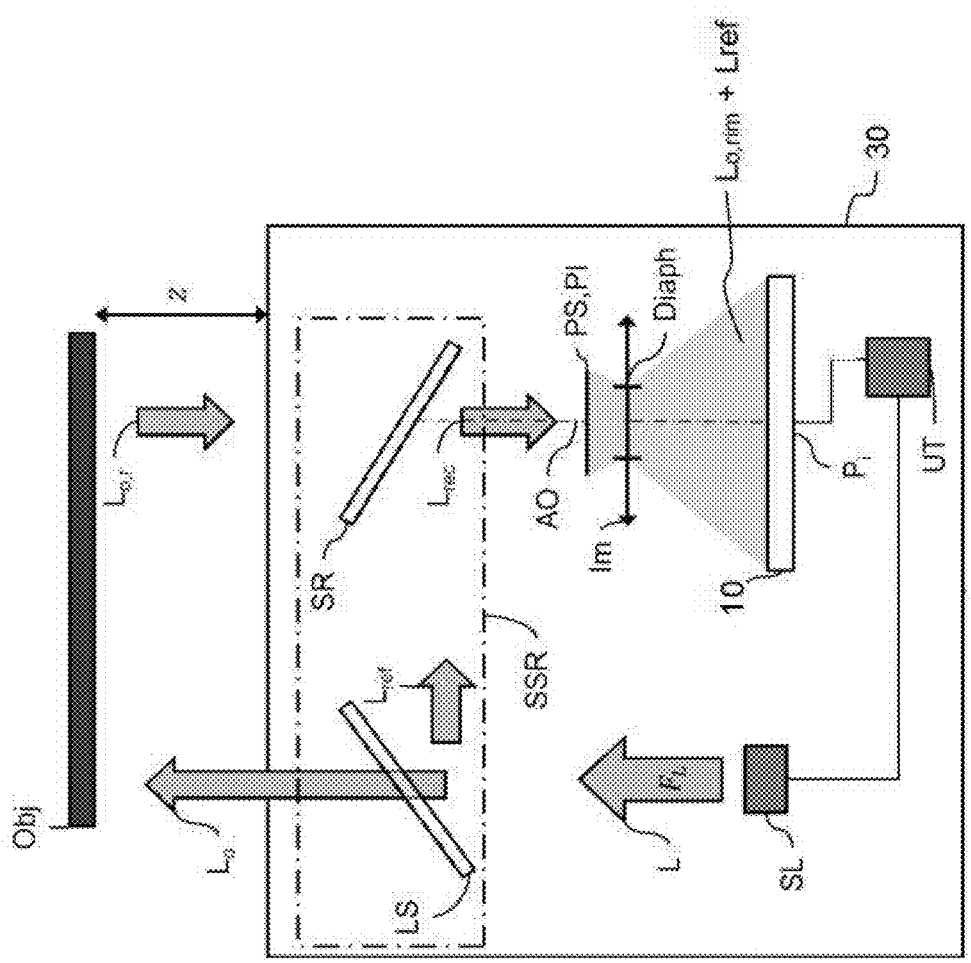
FIG. 13 illustrates a lidar imaging system according to the invention.

According to another aspect, the invention relates to a coherent lidar imaging system 30 as illustrated in FIG. 13. The lidar is of FMCW type and comprises a laser source SL configured to emit a laser radiation L with a temporally modulated optical frequency FL. Preferably, the optical frequency is modulated by a periodic ramp of excursion B and of duration T, and the coherence length of the laser radiation is at least twice the maximum predetermined distance zmax between the scene to be observed and the lidar.

The lidar 30 also comprises a splitting/recombining optical system SSR which comprises:
  a splitter optical system LS designed to spatially split the laser radiation L into a beam called the reference beam Lref and into a beam called the object beam Lo that is directed towards the scene to be observed Obj,
  a recombining optical system SR designed to spatially superpose the reference beam Lref onto the beam reflected by said scene Lo,r, so as to form a recombined beam Lrec.

The lidar 30 also comprises a detection device 10 as described above and an optical imaging system Im of optical axis AO which produces an image of the scene by focusing a beam reflected by the scene Lo,r on the detector, forming the image beam Lo,rim (Lo,rim is therefore the portion of the object beam focused by the optic Im). Since the scene is typically at infinity, the detector det is placed substantially in the focal plane of the optic Im.

The splitting/recombining optical system SSR and the optical imaging system Im are configured such that each pixel of the detector receives a portion of the image beam Lo,rim and a portion of the reference beam Lref, and that the portions are spatially superposed coherently onto each pixel.

The coherent lidar imaging system 30 further comprises at least one electronic processing circuit PC configured to calculate, for each pixel P(i,j), a frequency F(i,j) of the beat of the portion of the image beam with the portion of the reference beam illuminating the pixel.

Lastly, the lidar 30 comprises a processing unit UT connected to the laser source and to the detector Det of the detection device, and configured to determine a distance of points of the scene that are imaged on the pixels, on the basis of the calculated beat frequency associated with each pixel and on the basis of the modulated optical frequency of the laser radiation.

According to one preferred embodiment, each pixel P(i,j) comprises its own electronic processing circuit PC(i,j) designed to calculate the beat frequency associated with the pixel. All processing is thus performed locally on the pixel, which means a high level of integration at each pixel and a pixel of sufficient size. In this configuration, it is possible to operate in "global-shutter" mode, i.e. all of the pixels are processed simultaneously. The level of integration is maximum here and allows the data transfers to processing circuits to be minimized and therefore a high rate for distance images to be reached.

According to another embodiment, the processing is performed per row, or "rolling-shutter"-type processing. For this, each column i is connected to an electronic processing circuit PC(i) configured to calculate the beat frequency associated with each pixel of a given row at a given time. Such an architecture limits integration constraints in the pixel, allowing its size to be decreased, while carrying out the processing locally on the periphery of the detector. In this embodiment, only the image postprocessing is carried out in an external unit.

According to another variant, the beat frequency for each pixel is calculated in an external unit.

Thus, the one or more electronic processing circuits are located in the detector and/or in the external processing unit.

The beat frequency may be determined in a number of known ways, for example via Fourier transform or by counting the number of periods detected. In this last case, the processor of UT is configured to determine the distance z of a point of the scene associated with the pixel Pi by calculating the number N of periods detected Te over the duration T of the modulation of the optical frequency on the basis of the signal representative of the count.

In the invention, it is necessary to prevent the presence of interference fringes produced by the coherent superposition of the detected portion of the reflected beam Lo,r,i and the detected portion of the reference beam Lref,i within each illuminated pixel Pi. Specifically, such fringes would lead to the attenuation of the oscillations resulting from the beat between the two portions because the pixel indiscriminately integrates all contributions. To prevent the occurrence of these fringes, it is necessary for the wavefronts of the two portions to be similar on each of the pixels.

Preferably, the splitting/recombining optical system SSR is configured to convey the reference beam coherently from the laser source to an intermediate image plane PI, perpendicular to the optical axis AO of the optical imaging system Im, so as to produce a (virtual or real) coherent reference source with respect to the reflected beam. The intermediate plane PI is located close to the optical imaging system so as to generate flat-tint fringes, obtained by interference between the detected portion of the reflected beam Lo,r,i and the detected portion of the reference beam Lref,i on each illuminated pixel Pi. This flat-tint condition means that, on each pixel Pi, an axis of propagation of the portion Lo,r,i of the reflected beam is collinear or substantially collinear with an axis of propagation of the portion Lref,i of the reference beam. In the case where the object and reference beams are approximately plane waves at the level of each pixel Pi and if the directions of propagation of these two waves forms an angle $\theta$, the pitch of the fringes on the sensor then being $\Lambda/2 \sin \theta$, the condition for having at least one interfringe per pixel (flat tint) is given by $\theta < \lambda/(2 dpix)$ with dpix the pixel size, i.e. for example $\theta < 7°$ for $\lambda=1300$ nm and dpix=5 µm.

Said splitting/recombining optical system SSR is therefore configured to form a real or virtual intermediate image PS of the reference beam in the intermediate image plane PI, the plane PI being arranged so as to generate flat-tint fringes, obtained by interference between the portions, on each illuminated pixel. Some features and architectures of this type of lidar are described in document FR 2000408, not published by the filing date of this application.

Figure 14:
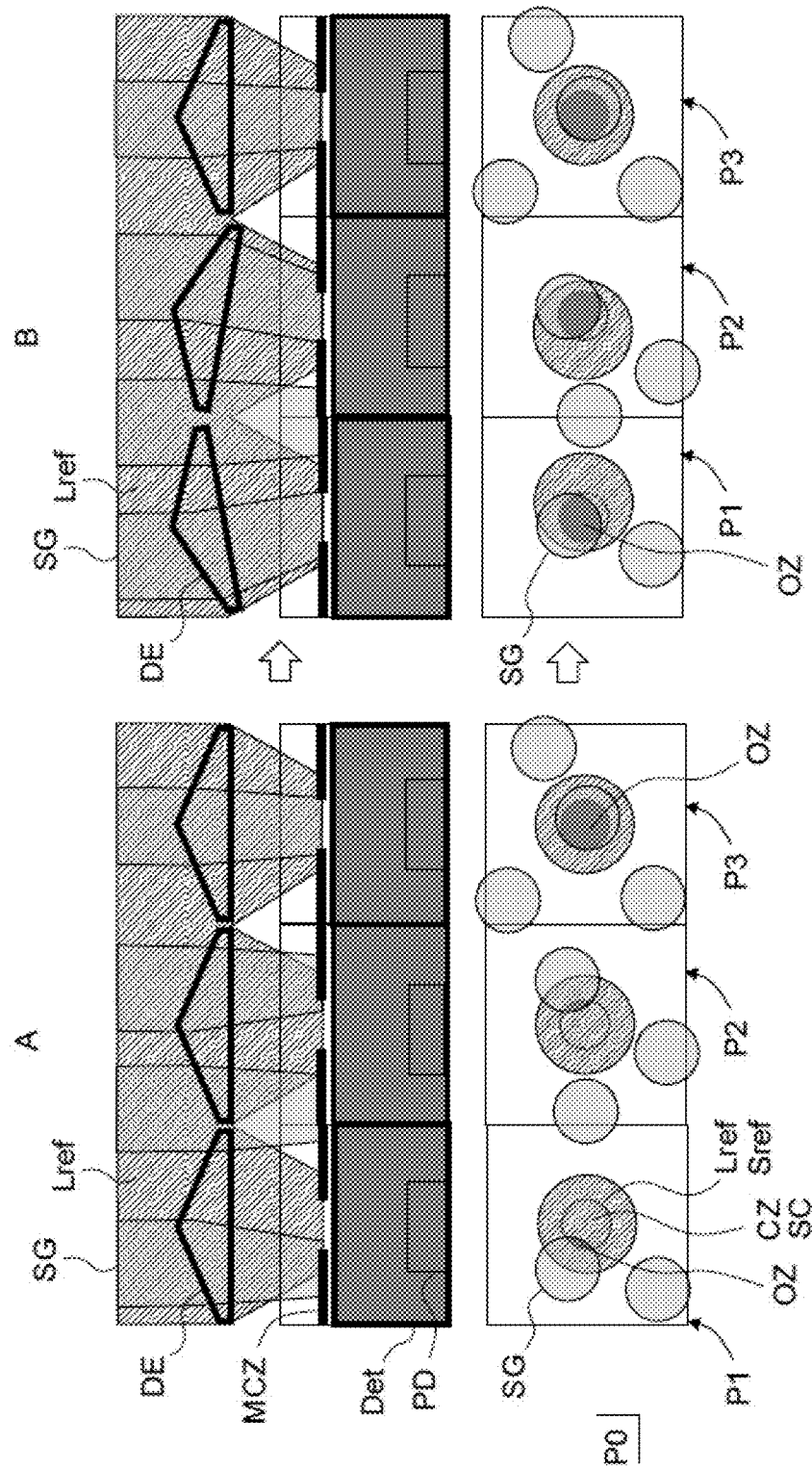
FIG. 14 schematically shows a schematic vertical and horizontal cross section of the detection device according to the invention and illustrates the effect of the deflecting elements on the speckle field in the case of the lidar according to the invention.

FIG. 14 shows a schematic vertical and horizontal cross section of the detection device according to the invention 10 and illustrates the effect of the deflecting elements on the speckle field in the case of the lidar 30 according to the invention, part A on the left before actuation and part B on the right after actuation. The device 10 is illuminated simultaneously by the reference beam and the image beam from the scene. The speckle grains in the plane of the coupling zone are distributed randomly and some of them fall outside the coupling zones.

Unlike the beam from the scene, the reference beam is not marked with speckle since it has not interacted with a rough surface. It approximately uniformly illuminates the matrix array of deflecting elements which transform it into a distribution of light spots at the surface of the photodetector or of the matrix array of coupling zones when present. The cross section of the reference beam Lref in this plane P0 of the photodetector or of the coupling zone inside a pixel is denoted by Sref, the cross section of a speckle grain SG is denoted by SG, the cross section of the coupling zone CZ is denoted by Sc and that of the photodetector corresponds to Sph. The following explanations address the case in which there is one coupling zone but are still applicable without coupling zones, by replacing the cross section Sc with the area Sph (or the area of the cross section of the charge-collecting zone at the upper interface of the semiconductor for the BSI case, in which the photodiode is not flush with the upper surface of the silicon).

The reference beam Lref is generally also affected by the actuation of the deflecting elements, and may be moved away from the coupling zone. However, the movements/changes in the image and reference beams at the surface of the coupling zone are generally different because their geometry is different at input of the deflecting element. In practice, the feedback loop arrives at a trade-off in the positioning of each of the focused beams, which also depends on the relative intensity of the two beams in each of the pixels, in order to obtain an optimum of the AC signal on each pixel of the imager. When the deflecting element is at rest, yet to be actuated, the reference beam and the beam from the scene form spots in the plane P0 of the coupling zone. A case where the reference beam is centred on the coupling zone is used here. In the pixels P1 and P2 of part A of FIG. 14, a speckle grain SG of the scene beam has a small intersection with the reference beam and with the coupling zone, delimited by the area OZ, defined as the zone of intersection between the three cross sections:

$$OZ = Sref \cap Sc \cap SG.$$

The pixel P3 is a particular case in which the speckle grain is initially centred on the coupling zone.

The interference occurs in the zone of intersection between the two beams, and only the portion of this zone that is included in the coupling zone allows the generation of an oscillation signal detected by the photoreceptor. For the two pixels P1 and P2, the AC signal is therefore of low amplitude.

The deflecting element then has to be oriented so as to increase the intersection of the three areas, Sref, Sc, Sc in order to maximize the AC signal as illustrated in part B, and an optimized area OZ is obtained for all of the pixels.

Figure 15:
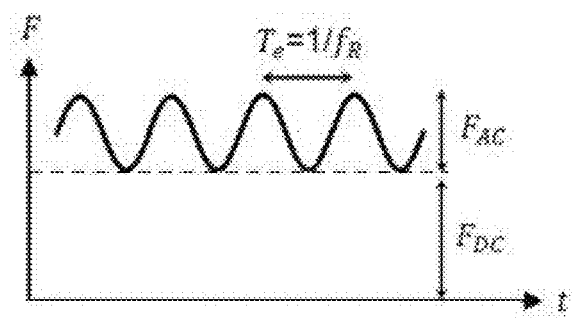
FIG. 15 illustrates the photon flux which reaches a photoreceptor.

The photon flux that reaches a photoreceptor is recalled in FIG. 15 and may be written in the form:

$$F = F_{DC} + F_{AC} \cos^2(\pi f_R t + \varphi)$$

$F_{DC}$ DC component and $F_{AC}$ amplitude component modulated at the frequency:

$$f_R = \frac{2Bz}{cT}$$

with z la distance sought and c the speed of light.
with the following assumptions:
   an FMCW imaging system is considered in which the optical frequency modulation of the laser is a periodic linear ramp of amplitude B and of period T, for the sake of simplicity, the intensity modulation of the laser, which generally accompanies the optical frequency modulation for a semiconductor laser in which the injection current is modulated, is ignored,
   it is assumed that the intensity of the two beams is constant within their respective cross sections Sref and Sc.

Figure 16:
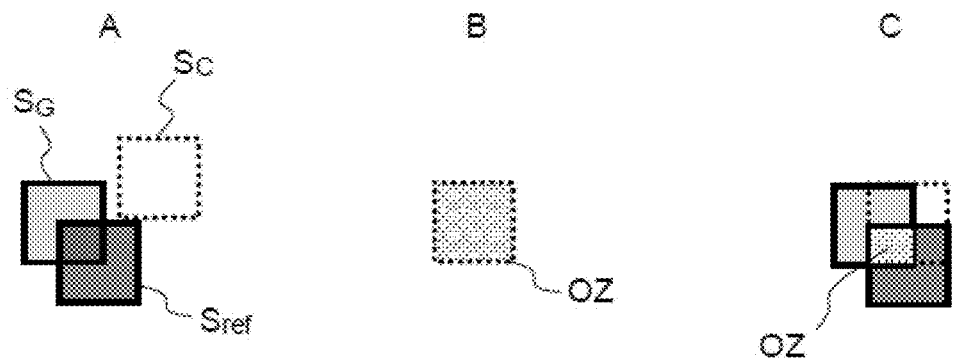
FIG. 16 illustrates three simple and schematic exemplary distributions of the sections of the reference beam, of the image beam and of the coupling zone.

By performing the interference calculation, it is demonstrated that the amplitude of the oscillations $F_{AC}$ is proportional to the quantity:

$$\frac{S_G \cap S_{ref} \cap S_c}{S_c}$$

which is a unitless function that may vary between 0 and 1. It is possible to illustrate its impact on $F_{AC}$ in three simple and schematic examples illustrated in FIG. 16 in which the beams have intensities and cross sections equal to the coupling zone:

Case A: the beams have non-zero superposition but do not intersect in the coupling zone, therefore:

$$\frac{S_G \cap S_{ref} \cap S_c}{S_c} = 0 \text{ and } F_{AC} = 0.$$

No modulated signal is measured and it is therefore not possible to measure the frequency of the beats.

Case B: the beams are perfectly superposed with one another and with the coupling zone, therefore:

$$\frac{S_G \cap S_{ref} \cap S_c}{S_c} = 1,$$

which maximizes the amplitude of $F_{AC}$

Case C: the beams are superposed over a quarter of their area and this intersection is located within the coupling zone, in which case:

$$\frac{S_G \cap S_{ref} \cap S_c}{S_c} = 0.25$$

and $F_{AC}$ is at a level of a quarter of the potentially accessible maximum amplitude represented by case B.

Figure 17:
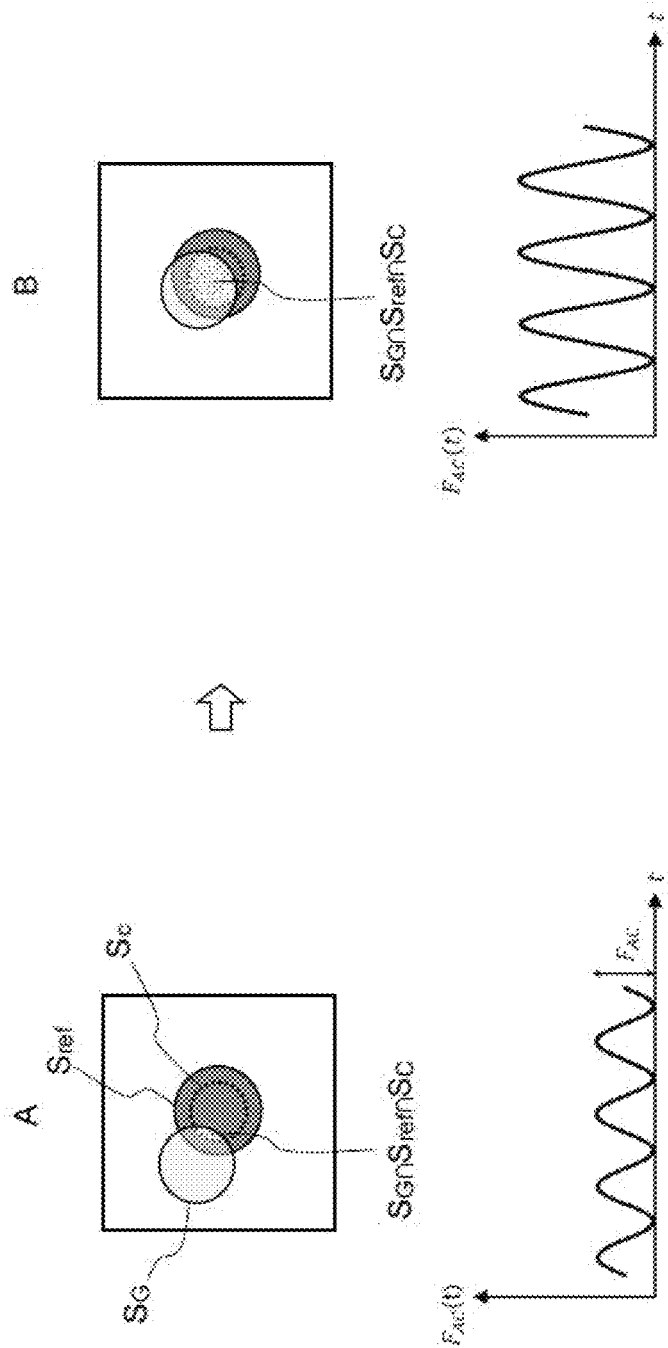
FIG. 17 illustrates the optimization of the amplitude of the AC signal detected by the photoreceptor by virtue of the deflecting element DE.

Thus, by maximizing the intersection of the three areas and thereby optimizing the amplitude of the AC signal detected by the photoreceptor by virtue of the deflecting element DE, it greatly facilitates the measurement of the frequency of the oscillations (illustrated in FIG. 17), for example by means of a method for counting peaks using a comparator.

The FMCW lidar imaging system according to the invention is:
   compatible with a large number of pixels in order to provide high-resolution images, fast, measuring the points of the scene in parallel,
   integrating at least a portion of the processing electronics at the level of the imager, ideally inside each pixel, which decreases the data flows from the imager to an external processor and, if possible, means that only the distance data are sent out of the imager,
   high-performance, with good heterodyne efficiency and small coupling zones (or small photosensitive surfaces) to limit the impact of speckle (the importance of which increases with increasing aperture size of the optical imaging system, in order to be able to measure relatively unreflective objects or those relatively far away).

Figure 18:
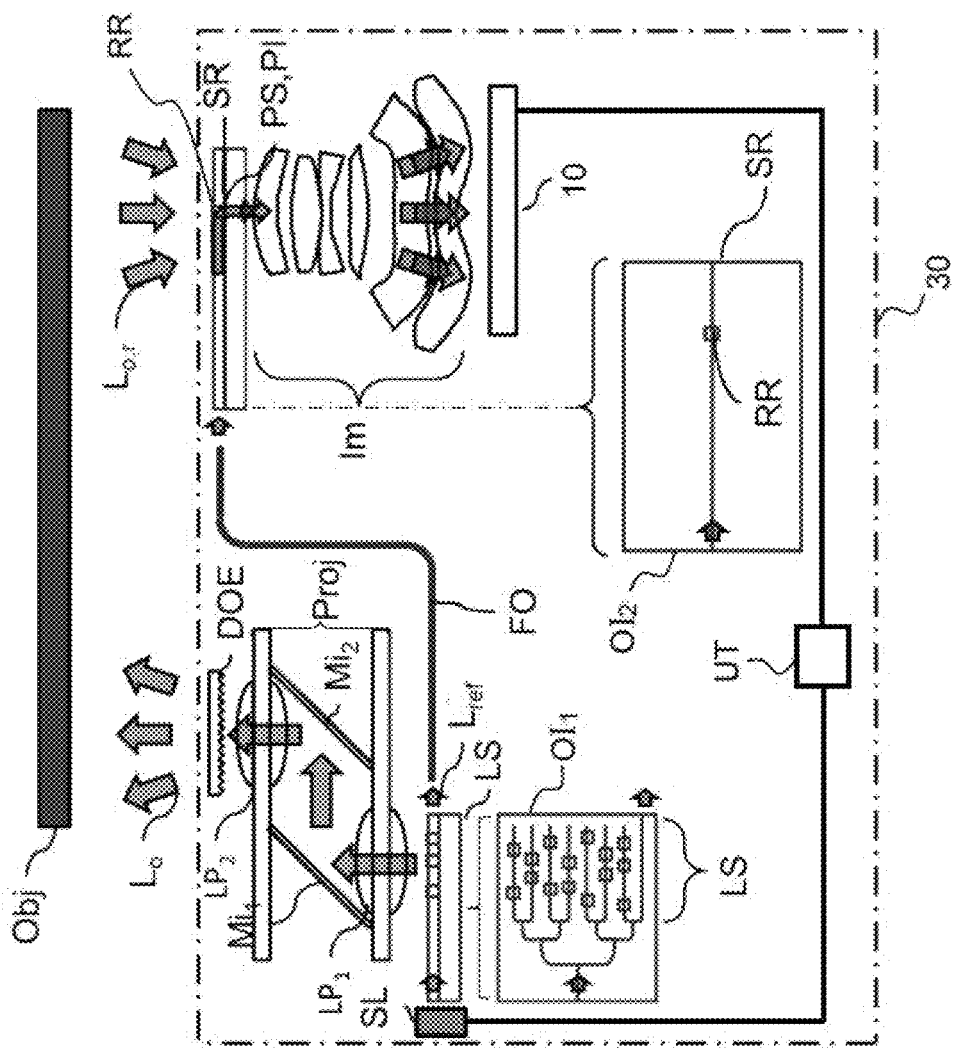
FIG. 18 illustrates a first embodiment of a first variant of the lidar of the invention (guided optics).
Figure 19:
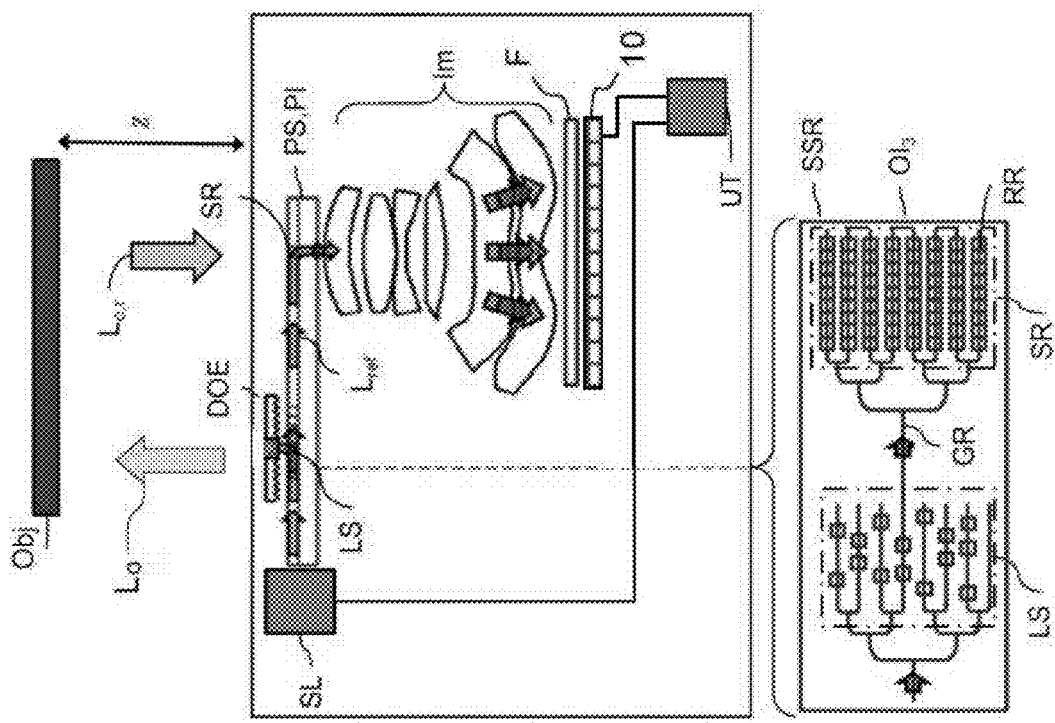
FIG. 19 illustrates a second embodiment of the first variant of the lidar of the invention (guided optics).
Figure 20:
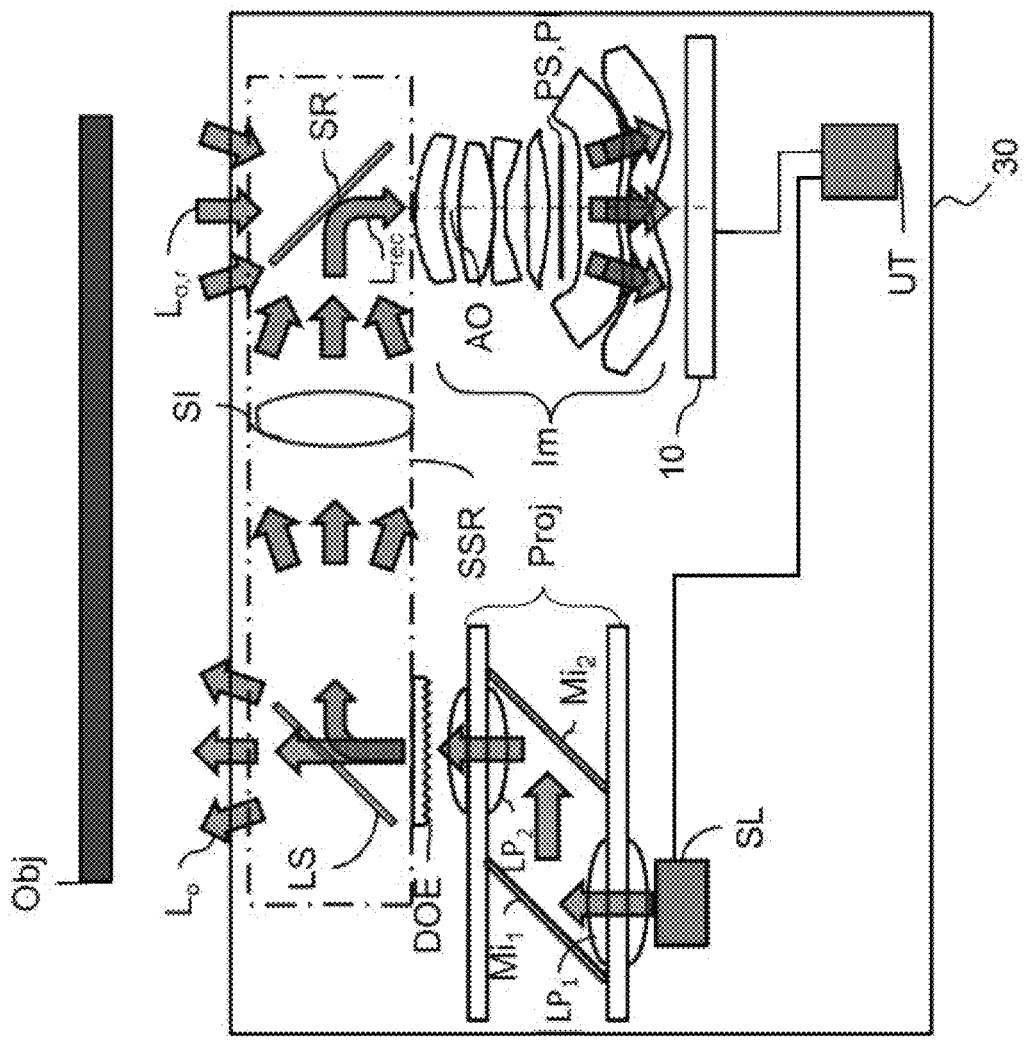
FIG. 20 illustrates a second variant of the lidar of the invention (free-space intermediate optics).

Different architectures of the lidar 30 according to the invention, also described in document FR200408, are recalled below. FIGS. 18 and 19 illustrate a first lidar variant (integrated optics) and FIG. 20 illustrates a second variant (free-space intermediate optics).

FIG. 18 presents a first embodiment of the first variant of the lidar of the invention, in which the splitter optical system LS comprises a first integrated optical circuit $OI_1$ in order to decrease the vertical bulk of the device. The laser radiation L is coupled in a waveguide made using a material of higher index than the substrate of the integrated optical circuit. The first integrated optical circuit $OI_1$ comprises a plurality of waveguides each comprising at least one diffraction grating, called the object grating, which splits the two, reference/object, paths. Specifically, the object gratings are designed so as to vertically extract (or more generally, extract out of the plane of the circuit OI1) a portion of the light from the waveguide, forming the object beam, the other portion continuing its propagation through at least one waveguide and forming the reference beam $L_{ref}$. According to one option, a plurality of diffraction gratings is used which improves the uniformity or allows the wavefront of the object beam to be adjusted, provided that a phase condition between the different gratings is satisfied. According to another option, the first integrated optical circuit comprises a single diffraction grating on a single waveguide.

According to one embodiment also illustrated in FIG. 18, an optical projection system Proj is provided to project the light onto a predetermined zone of the scene to be observed, the image of which will subsequently be formed on the detector, therefore typically a rectangular zone. Preferably, the optical projection system illuminates the scene with a cone of angular aperture that is substantially equal to the field angle of the optical imaging system (which is determined by its focal distance and the size of the imager). Thus, whatever the distance of the scene, its image corresponds to the size of the imager.

In addition, the optical projection system is preferably designed to illuminate the predetermined zone of the scene uniformly in order to subsequently ensure an illumination and a signal-to-noise ratio that is uniform on the detector if the scene is Lambertian. What is meant here by substantially uniform is that the standard deviation of the luminous intensity on the predetermined zone of the scene is for example less than 25% of the average luminous intensity. According to one embodiment, the optical projection system Proj comprises a conventional optical system with two stages comprising a first, collimating lens $LP_1$ and a second lens $LP_2$ which forms the image of the first lens on the scene (for example, the first lens is approximately at the object focal point of the second lens in order to address the image of the source on the scene which is almost at infinity). The laser source SL is at the object focal point of the collimating lens $LP_1$. In the embodiment of FIG. 18, the system of lenses is folded in order to decrease the vertical bulk of the projection system and therefore comprises two mirrors at 45° $Mi_1$, and $Mi_2$.

FIG. 18 also illustrates one embodiment in which the lidar 30 comprises a shaping optical device DOE (diffractive optical element) consisting of periodic patterns with a period of the order of the wavelength of the laser radiation which is arranged after the projection system in order to allow the uniformity of this illumination to be improved. Alternatively, according to another embodiment, the shaping optical device may be omitted and may be replaced with the projection system Proj. The projection system and the shaping optical device may be used alone or in combination in all of the embodiments of the invention.

FIG. 18 also shows a schematic view of a recombining optical system SR according to one embodiment of the invention. In this embodiment, the recombining optical system comprises an integrated optical circuit $OI_2$, called the second integrated optical circuit, in order to decrease the vertical bulk of the device. The reference beam $L_{ref}$ is coupled in the second integrated optical circuit by means of an optical element FO. The second integrated optical circuit comprises at least one waveguide comprising at least one diffraction grating called the reference grating RR which allows the extraction of the light in the direction of the detector through at least part of the optical imaging system Im. The reference grating allows the generation of the equivalent of a point source constituting the intermediate image PS on the reference path, close to the optical imaging system. Thus, the second integrated optical circuit is arranged in the intermediate image plane PI so that the reference grating forms (i.e. constitutes) the intermediate image PS.

According to one embodiment of the recombining optical system of FIG. 18, the reference grating is a grating of high contrast grating (HCG) type which allows the decoupling of the light preferentially on one side of the waveguide (in FIG. 18, towards the optical imaging system). The lateral dimensions of the grating are reduced (approximately a few wavelengths of the laser radiation) in order to allow suitable divergence of the reference beam coming from the reference grating and broad illumination of the pupil in order to illuminate the entirety of the detector. As for the object path, it will be relatively unaffected by the insertion of a waveguide and of a grating into the path of the light. The waveguide is not located in a conjugate plane of the image sensor and therefore will not affect the formation of the image on the sensor. In the case where it is positioned inside the optical imaging system, the substrate on which the waveguide is produced may be inserted between two lenses of the optical imaging system Im when this system comprises at least two lenses.

In another variant, the reference path is recombined with the object path by a plurality of reference diffraction gratings. According to this variant, there is a phase relationship between the reference gratings so that they are designed to create a wavefront on the pixels of the detector of which the tangent at each point does not form an angle greater than $$\frac{\lambda}{2d_{pix}}$$

with respect to the tangent of the wavefront of the object beam. For this, the guides of the circuit $OI_2$ are single-mode guides. According to one embodiment, the circuit $OI_2$ comprises phase-shifters in the waveguides or at the output of the reference grating. Each diffraction grating behaves like a secondary source. The gratings are arranged regularly so as to form a matrix array of rows and columns, preferably of the same period. Preferably, the light diffracted by the array of gratings forms light patterns that are regularly spaced in the plane of the device 10 with one pattern motif per pixel. The advantage of having a plurality of reference gratings is that it makes it possible to better distribute the light patterns, better control the uniformity of the illumination of the detector by the secondary point sources and better adjust the wavefront of the reference beam with respect to the wavefront of the object beam on the detector Det. Since the contrast in index of the gratings and of the guides that supply the gratings remains low, and since the gratings are not imaged on the detector, the object path is not or hardly affected by passing through these gratings on transmission.

Alternatively, according to another embodiment, the guided reference beam is decoupled into free space towards the optical imaging system using a half-silvered mirror included in the waveguide and oriented at 45° with respect to the axis of propagation in the waveguide. The advantage of the embodiment with a grating is that it decreases flux losses on the reference path with respect to the embodiment with a half-silvered mirror.

The recombining system of FIG. 18 allows the total thickness of the device to be decreased because it replaces a bulky micro-optics component (for example a half-silvered mirror, the vertical bulk of which is approximately equal to the diameter of the entrance pupil of the optical imaging system) with a simple substrate with a thickness of around or smaller than a millimetre. The embodiments of the splitting optical system and of the recombining optical system as described in FIG. 18 may also be used separately.

FIG. 18 also illustrates one embodiment in which the coupling $L_{ref}$ in the second integrated optical circuit is performed by means of an optical fibre FO. This fibre is designed to guide the reference beam from the first integrated optical circuit $OI_1$ to the second integrated optical circuit $OI_2$. The use of two integrated optical circuits allows the vertical bulk of the device to be decreased.

FIG. 19 presents an imaging device according to a second embodiment of the first lidar variant according to the invention. This second embodiment is close to that of FIG. 18, apart from that the first integrated optical circuit $OI_1$ and the second integrated optical circuit $OI_2$ of the device of FIG. 18 now form just one integrated optical circuit called the third integrated circuit $OI_3$, which then comprises the splitter optical system LS and said recombining optical system SR.

In this embodiment, the splitting/recombining optical system therefore comprises the third integrated optical circuit $OI_3$ in which the laser radiation L is coupled. At least one waveguide of the integrated circuit called the reference waveguide GR guides the reference beam $L_{ref}$ towards the recombining system SR comprising at least one reference grating RR, which is located on the reference waveguide. The third integrated optical circuit $OI_3$ is arranged in the intermediate image plane so that the reference grating forms the intermediate image PS. In the example of FIG. 19, by way of non-limiting illustration, the recombining optical system comprises a plurality of reference gratings. Alternatively, according to another embodiment, the recombining optical system comprises a single reference grating.

This embodiment has the advantage of avoiding the flux losses caused by the coupling/decoupling of the reference beam in the optical fibre FO of the device of FIG. 18. In addition, this arrangement allows the complexity and bulk of the system to be decreased.

FIG. 19 also illustrates one embodiment in which the lidar comprises a bandpass optical filter F, placed in front of the device 10 or in front of each pixel (provided to measure the distance) of the detector (for example in the case of acquiring images of RGB-z type) and centred on the emission wavelength of the laser in order to filter a large portion of the ambient stray light.

FIG. 20 presents a schematic view of the lidar 30 according to a second variant of invention. In this second variant, the splitting/recombining system SSR further comprises an intermediate optical system SI, arranged after the splitter optical system LS, and before the recombining optical system SR. This intermediate optical system SI is designed to focus the reference beam and form the intermediate image PS in the intermediate plane PI. According to one embodiment, this intermediate optical system is a lens or a set of lenses and of optical diffusers. More specifically, the intermediate optical system allows the reference beam $L_{ref}$ to be shaped by making it converge towards the optical imaging system such that the reference beam illuminates the entirety of the detector Det of the device 10 (in combination with the matrix array of deflecting elements which does not substantially modify the path of the reference beam), and so that the wavefronts of the object and reference beams at each pixel are similar. Thus, in this embodiment, the splitter optical system and the recombining optical system may be a cube splitter or a plate splitter. In the embodiment of FIG. 20, an assembly similar to that of the embodiment of FIG. 18, formed of an optical projection system Proj and of a shaping optical element DOE, allows a predetermined zone of the scene to be illuminated substantially uniformly.

Alternatively, according to another embodiment of this second variant, the assembly formed by the optical projection system Proj and the shaping optical element DOE is placed downstream of the splitter optical system, on the path of the object beam.

The invention claimed is:

1. A coherent lidar imaging system comprising:
   a detector (Det) comprising a matrix array of pixels (P), each pixel (P) comprising a photodetector component (PD) having a photosensitive surface (Sph), the detector being designed to be illuminated by a coherent beam, called the image beam (Lo,rim) consisting of grains of light called speckle grains (SG),
   a matrix array of transmissive deflecting elements (DE) arranged on the side of the illumination by the coherent beam, a deflecting element being associated with a group of one or more pixels comprising at least one pixel, and configured to be individually orientable by means of an electrical signal, so as to deflect a fraction of the image beam incident on said group, and thus modify the spatial distribution of the speckle grains in the plane of the photosensitive surface,
   each group of one or more pixels further comprising a feedback loop (SL) associated with the deflecting element and configured to actuate the deflecting element so as to optimize the signal or the signal-to-noise ratio from the light detected by the one or more photodetector components of said group of pixels, the feedback loop comprising a feedback circuit (SLC),
   a laser source (SL) configured to emit a laser radiation (L) with a temporally modulated optical frequency ($F_L$),
   a splitting/recombining optical system (SSR) comprising at least:
      a splitter optical system (LS) designed to spatially split the laser radiation (L) into a beam called the reference beam ($L_{ref}$) and into a beam called the object beam ($L_o$) that is directed towards the scene to be observed (Obj);
      a recombining optical system (SR) designed to spatially superpose the reference beam ($L_{ref}$) onto the beam reflected by said scene ($L_{o,r}$), so as to form a recombined beam ($L_{rec}$),
   an optical imaging system (Im) having an optical axis (AO) and producing an image of the scene by focusing a beam reflected by the scene (Lo,r) on the detector, forming the image beam (Lo,rim),
   the splitting/recombining optical system (SSR) and the optical imaging system (Im) being configured such that each pixel of the detector receives a portion of the image beam (Lo,rim) and a portion of the reference beam (Lref), and that said portions are spatially superposed coherently onto each pixel,
   the coherent lidar imaging system further comprising at least one electronic processing circuit (PC) configured to calculate, for each pixel, a frequency (F(i,j)) of a beat of the portion of the image beam with the portion of the reference beam illuminating said pixel,
   a processing unit (UT) connected to the laser source and to the detection device and configured to determine a distance of points of the scene that are imaged on said pixels, on the basis of the calculated beat frequency associated with each pixel and on the basis of the modulated optical frequency of the laser radiation, said electronic processing circuit being located in the detector and/or in the processing unit.

2. The system according to claim 1, wherein the deflecting element is chosen from a prism, a polyhedron, a spherical dome, and a diffractive optical element.

3. The system according to claim 1, wherein each deflecting element comprises at least two electrodes (E1, E2) respectively facing at least two electrodes (DE1, DE2) arranged on the surface of the detector, the deflecting element being actuated electrostatically by applying voltages to the electrodes, on at least one axis of rotation parallel to the plane of the detector.

4. The system according to claim 1, wherein a deflecting element is associated with a group of n×m pixels, the feedback being produced on the basis of the n×m signals detected by the photodetector components of said pixels of the group, according to an optimization criterion.

5. The system according to claim 1, wherein the detector further comprises a matrix array (MCZ) of coupling zones (CZ) that is arranged between the matrix array of deflecting elements and the photodetector component, a coupling zone being associated with a pixel and configured to form an aperture through which the image beam illuminates the photodetector component of the associated pixel, a dimension (dc) of the aperture being smaller than a dimension (ds) of the photosensitive surface of the pixel.

6. The system according to claim 1, wherein a distance between the matrix array of deflecting elements and the detector is between one and ten times a dimension of the deflecting element.

7. The system according to claim 1, wherein said splitting/recombining optical system (SSR) is further configured to form a real or virtual intermediate image (PS) of the reference beam in a plane perpendicular to said optical axis, called the intermediate image plane (PI), said intermediate plane being arranged so as to generate flat-tint fringes, obtained by interference between said portions, on each illuminated pixel.

8. The system according to claim 7, wherein said splitting/recombining optical system (SSR) is configured so that the intermediate image plane is coincident with a plane comprising a pupil or a diaphragm of said optical imaging system (Im).

9. The system according to claim 7, wherein the splitter optical system (LS) comprises an integrated optical circuit, called the first integrated optical circuit (OI1), wherein said laser radiation is coupled, at least one waveguide of said first integrated circuit guiding said reference beam, the first integrated optical circuit further comprising a plurality of waveguides each comprising at least one diffraction grating, called the object grating, so as to form the object beam.

10. The system according to claim 7, wherein the recombining optical system (SR) comprises an integrated optical circuit, called the second integrated optical circuit (OI2), wherein said reference beam is coupled by means of an optical element (FO), the second integrated optical circuit comprising at least one waveguide comprising at least one diffraction grating called the reference grating (RR), the reference grating coupling the reference beam into free space and into the optical imaging system, the second integrated optical circuit being arranged in said intermediate image plane so that the reference grating forms the intermediate image (PS).

11. The system according to claim 10, wherein said optical element is an optical fibre (FO) guiding said reference beam from the first integrated optical circuit to said second integrated optical circuit.

12. The system according to claim 7, wherein the splitting/recombining optical system comprises an integrated optical circuit, called the third integrated circuit (OI3), wherein said laser radiation is coupled, said integrated optical circuit comprising the splitter optical system (LS) and said recombining optical system (SR).

13. The system according to claim 7, wherein the splitting/recombining optical system further comprises an intermediate optical system (SI), arranged after the splitter optical system (LS), and before the recombining optical system (SR), the intermediate optical system being designed to focus the reference beam and form said intermediate image.

14. The system according to claim 1, wherein a numerical aperture (f #) of the optical imaging system (Im1) and a wavelength ($\lambda 0$) of the laser beam are determined such that a lateral dimension ($\phi g$) of said speckle grains (SG) is smaller than or equal to a dimension (ds) of the photosensitive surface of a pixel and larger than or equal to a dimension of the coupling zone, where applicable.

* * * * *